(12) United States Patent
Shahidi et al.

(10) Patent No.: US 11,895,590 B2
(45) Date of Patent: Feb. 6, 2024

(54) TECHNIQUES FOR MANAGING A RADIO TRANSCEIVER CHAIN FOR MULTIPLE RADIO ACCESS TECHNOLOGIES

(71) Applicant: QUALCOMM Incorporated, San Diego, CA (US)

(72) Inventors: Reza Shahidi, San Diego, CA (US); Brian Clarke Banister, San Diego, CA (US); Vishal Mahajan, Dublin, CA (US); Vikram Ramesh Babu, San Diego, CA (US); Joshua Tennyson Macdonald, Superior, CO (US); Thawatt Gopal, San Diego, CA (US); Udayan Bhawnani, San Diego, CA (US); Yu Fu, San Diego, CA (US); Bhupesh Manoharial Umatt, Poway, CA (US); Sridhar Bandaru, Westminster, CO (US); Scott Hoover, Del Mar, CA (US); Brian George, San Diego, CA (US); Hemanth Kumar Rayapati, San Diego, CA (US); Sunil Kc, Frederick, CO (US); Sandeep Ramannavar, San Diego, CA (US); Sandeep Rao, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 261 days.

(21) Appl. No.: 17/320,197

(22) Filed: May 13, 2021

(65) Prior Publication Data

US 2021/0360530 A1 Nov. 18, 2021

Related U.S. Application Data

(60) Provisional application No. 63/025,273, filed on May 15, 2020, provisional application No. 63/025,528, filed on May 15, 2020.

(51) Int. Cl.
*H04W 36/30* (2009.01)
*H04W 52/02* (2009.01)
(Continued)

(52) U.S. Cl.
CPC ......... *H04W 52/0232* (2013.01); *H04W 8/20* (2013.01); *H04W 52/0216* (2013.01); *H04W 76/28* (2018.02)

(58) Field of Classification Search
None
See application file for complete search history.

(56) References Cited

U.S. PATENT DOCUMENTS

2016/0095040 A1* 3/2016 Valliappan ............ H04W 36/14
370/332
2018/0368099 A1* 12/2018 Chen ...................... H04W 68/02

FOREIGN PATENT DOCUMENTS

EP 2515593 A2 10/2012

OTHER PUBLICATIONS

International Search Report and Written Opinion—PCT/US2021/032460—ISA/EPO—dated Aug. 31, 2021.

* cited by examiner

*Primary Examiner* — Gary Lafontant
(74) *Attorney, Agent, or Firm* — Dalei Dong; Holland & Hart LLP

(57) ABSTRACT

A user equipment (UE) may monitor a channel for wireless communication associated with a first radio access technology (RAT) during one or more of a first active duration or a first inactive duration. The UE may operate in a first power mode during the first inactive duration. The UE may monitor the channel for wireless communication associated with a second RAT during one or more of a second active duration or a second inactive duration. The UE may operate during the second inactive duration in one or more of the first power (Continued)

mode or a second power. The UE may operate according to the first mode or the second mode based on the monitoring of the channel associated with the first RAT and the second RAT.

30 Claims, 16 Drawing Sheets

(51) Int. Cl.
*H04W 76/28* (2018.01)
*H04W 8/20* (2009.01)

TECHNIQUES FOR MANAGING A RADIO TRANSCEIVER CHAIN FOR MULTIPLE RADIO ACCESS TECHNOLOGIES

CROSS REFERENCE

The present Application for Patent claims the benefit of U.S. Provisional Patent Application No. 63/025,273 by SHAHIDI et al., entitled "SHARING RADIO TRANSCEIVER CHAIN BETWEEN DISTINCT RADIO COMMUNICATION TECHNOLOGIES," filed May 15, 2020, and U.S. Provisional Patent Application No. 63/025,528 by SHAHIDI et al., entitled "SHARING RADIO TRANSCEIVER CHAIN BETWEEN DISTINCT RADIO COMMUNICATION TECHNOLOGIES," filed May 15, 2020, assigned to the assignee hereof, and hereby incorporated by reference in its entirety.

FIELD OF DISCLOSURE

The present disclosure, for example, relates to wireless communication systems, more particularly to techniques for managing a radio transceiver chain for multiple radio access technologies (RATs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The present disclosure relates to techniques for managing one or more radio transceiver chains for multiple radio access technologies (RATs). The described techniques each have several innovative aspects, no single one of which is solely responsible for the desirable attributes disclosed herein.

A method for wireless communication at a device is described. The method may include monitoring a channel for wireless communication associated with a first RAT during one or more of a first active duration or a first inactive duration, the device operating in a first power mode during the first inactive duration, monitoring the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration, and operating the device according to the first power mode or the second power mode based on the monitoring of the channel associated with the first RAT and the second RAT.

An apparatus for wireless communication at a device is described. The apparatus may include a processor, memory coupled with the processor, and instructions stored in the memory. The instructions may be executable by the processor to cause the apparatus to monitor a channel for wireless communication associated with a first RAT during one or more of a first active duration or a first inactive duration, the device operating in a first power mode during the first inactive duration, monitor the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration, and operate the device according to the first power mode or the second power mode based on the monitoring of the channel associated with the first RAT and the second RAT.

Another apparatus for wireless communication at a device is described. The apparatus may include means for monitoring a channel for wireless communication associated with a first RAT during one or more of a first active duration or a first inactive duration, the device operating in a first power mode during the first inactive duration, means for monitoring the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration, and means for operating the device according to the first power mode or the second power mode based on the monitoring of the channel associated with the first RAT and the second RAT.

A non-transitory computer-readable medium storing code for wireless communication at a device is described. The code may include instructions executable by a processor to monitor a channel for wireless communication associated with a first RAT during one or more of a first active duration or a first inactive duration, the device operating in a first power mode during the first inactive duration, monitor the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration, and operate the device according to the first power mode or the second power mode based on the monitoring of the channel associated with the first RAT and the second RAT.

In some examples of the method, apparatuses, and non-transitory computer-readable medium described herein, the device includes a radio transceiver chain for one or more of receiving or transmitting the wireless communication associated with one or more of the first RAT or the second RAT.

Some examples of the method, apparatuses, and non-transitory computer-readable medium described herein may further include operations, features, means, or instructions for operating the radio transceiver chain associated with the device in the first power mode during the first inactive duration based on the monitoring of the channel for the wireless communication associated with the first RAT during one or more of the first active duration or the first inactive duration. By operating the radio transceiver chain associated with the device in the first power mode during the first inactive duration based on the monitoring of the channel for the wireless communication associated with the first RAT during one or more of the first active duration or the first inactive duration, the device may experience reduced power consumption.

In some examples of the method, apparatuses, and non-transitory computer-readable medium described herein, monitoring the channel for the wireless communication associated with the first RAT may include operations, features, means, or instructions for enabling the radio transceiver chain to monitor the channel for the wireless communication associated with the first RAT during the first active duration based on a timer, activating the timer based on the enabling of the radio transceiver chain to monitor the channel for the wireless communication associated with the first RAT during the first active duration, and disabling the radio transceiver chain from monitoring the channel for the wireless communication associated with the first RAT by switching the radio transceiver chain to operate in the first power mode during the first inactive duration based on the timer expiring. By monitoring the channel for the wireless communication associated with the first RAT during the first active duration based on the timer, the device may experience reduced latency and processing, as well as an extended battery life for the device.

Some examples of the method, apparatuses, and non-transitory computer-readable medium described herein may further include operations, features, means, or instructions for operating the radio transceiver chain associated with the device in one or more of the first power mode or the second power mode during the second inactive duration based on the monitoring of the channel for the wireless communication associated with the second RAT during one or more of the second active duration or the second inactive duration. By operating the radio transceiver chain associated with the device in one or more of the first power mode or the second power mode during the second inactive duration, the device may experience reduced power consumption.

In some examples of the method, apparatuses, and non-transitory computer-readable medium described herein, monitoring the channel for the wireless communication associated with the second RAT may include operations, features, means, or instructions for enabling the radio transceiver chain to monitor the channel for the wireless communication associated with the second RAT during the second active duration based on a timer, activating the timer based on the enabling of the radio transceiver chain to monitor the channel for the wireless communication associated with the second RAT during the second active duration, and disabling the radio transceiver chain from monitoring the channel for the wireless communication associated with the second RAT by switching the radio transceiver chain to operate in the first power mode or the second power mode during the second inactive duration based on the timer expiring. By monitoring the channel for the wireless communication associated with the second RAT during the second active duration based on the timer, the device may experience reduced latency and processing, as well as an extended battery life for the device.

Some examples of the method, apparatuses, and non-transitory computer-readable medium described herein may further include operations, features, means, or instructions for switching the radio transceiver chain to operate in the first power mode during the second inactive duration based on the first inactive duration nonoverlapping with one or more of an ending portion of the second active duration or a beginning portion of the third active duration following the second active duration. By switching the radio transceiver chain to operate in the first power mode during the second inactive duration, the device may experience more efficient utilization of resources.

Some examples of the method, apparatuses, and non-transitory computer-readable medium described herein may further include operations, features, means, or instructions for switching the radio transceiver chain to operate in the second power mode during the second inactive duration based on the first inactive duration overlapping with one or more of an ending portion of the second active duration or a beginning portion of the third active duration following the second active duration. By switching the radio transceiver chain to operate in the second power mode during the second inactive duration, the device may experience more efficient utilization of resources.

Some examples of the method, apparatuses, and non-transitory computer-readable medium described herein may further include operations, features, means, or instructions for receiving control signaling indicating a configuration for the device, the configuration indicating one or more of the first active duration, the first inactive duration, the second active duration, the second inactive duration, or the third active duration and where operating the radio transceiver chain in one or more of the first power mode or the second power mode may be based on the configuration. By receiving the control signaling, the device may support more efficient utilization of resources.

Some examples of the method, apparatuses, and non-transitory computer-readable medium described herein may further include operations, features, means, or instructions for adjusting the second active duration based on a portion of the first active duration overlapping with a portion of the second active duration. By adjusting the second active duration, the device may support more efficient utilization of resources.

Some examples of the method, apparatuses, and non-transitory computer-readable medium described herein may further include operations, features, means, or instructions for determining one or more of a beginning of the first active duration or a beginning of the second active duration based on scheduling information and adjusting the beginning of the second active duration to occur before the beginning of the first active duration based on determining that the portion of the first active duration overlaps with the portion of the second active duration. Based on the determination, the device may support more efficient utilization of resources.

Some examples of the method, apparatuses, and non-transitory computer-readable medium described herein may further include operations, features, means, or instructions for determining one or more of an ending of the first active duration or an ending of the second active duration based on scheduling information and adjusting the ending of the second active duration to occur after the ending of the first active duration based on determining that the portion of the first active duration overlaps with the portion of the second active duration. Based on the determination, the device may support more efficient utilization of resources.

In some examples of the method, apparatuses, and non-transitory computer-readable medium described herein, allocating, based on a configuration, a first set of antennas associated with the device to monitor the channel for the wireless communication associated with the first RAT during one or more of the first active duration or the first inactive duration and allocating, based on the configuration, a second set of antennas associated with the device to monitor the channel for the wireless communication associated with the second RAT during one or more of the second active duration or the second inactive duration. By allocating different sets of antennas for different RATs, the device may support improved coordination between the different RATs.

In some examples of the method, apparatuses, and non-transitory computer-readable medium described herein, the first set of antennas may be nonoverlapping with the second set of antennas.

Some examples of the method, apparatuses, and non-transitory computer-readable medium described herein may further include operations, features, means, or instructions for reallocating one or more of the first set of antennas or the second set of antennas based on one or more of the first active duration or the second active duration. By reallocating different sets of antennas for different RATs, the device may support improved coordination between the different RATs.

Some examples of the method, apparatuses, and non-transitory computer-readable medium described herein may further include operations, features, means, or instructions for managing one or more memory registers associated with the device for one or more of the first RAT and the second RAT, the one or more memory registers corresponding to a radio transceiver chain associated with the device, the one or more memory registers may be shared between the first RAT and the second RAT. By managing the one or more memory registers associated with the device for one or more of the first RAT and the second RAT, the device may support reduced processing.

In some examples of the method, apparatuses, and non-transitory computer-readable medium described herein, managing the one or more memory registers may include operations, features, means, or instructions for refraining a first SIM associated with the device and a second SIM associated with the device from jointly adjusting a state of the one or more memory registers, the first SIM corresponding to the first RAT and the second SIM corresponding to the second RAT. By refraining the first SIM associated with the device and the second SIM associated with the device from jointly adjusting the state of the one or more memory registers, the device may support reduced processing and improved utilization of processing capability.

Some examples of the method, apparatuses, and non-transitory computer-readable medium described herein may further include operations, features, means, or instructions for refraining a first SIM associated with the device and a second SIM associated with the device from jointly adjusting an operating mode of a radio transceiver chain associated with the device. By refraining the first SIM associated with the device and the second SIM associated with the device from jointly adjusting the operating mode of the radio transceiver chain, the device may support improved coordination between the first SIM and the second SIM.

Some examples of the method, apparatuses, and non-transitory computer-readable medium described herein may further include operations, features, means, or instructions for adjusting an operating mode of a radio transceiver chain associated with the device based on an acknowledgement between a first SIM associated with the device and a second SIM associated with the device, the first SIM corresponding to the first RAT and the second SIM corresponding to the second RAT. By adjust the operating mode of the radio transceiver chain associated with the device based on the acknowledgement, the device may support improved coordination between the first SIM and the second SIM.

Some examples of the method, apparatuses, and non-transitory computer-readable medium described herein may further include operations, features, means, or instructions for disabling a baseband circuit and a radio frequency (RF) front-end circuit associated with the device while the device may be operating in the first power mode. By disabling the baseband circuit and the RF front-end circuit, the device may experience reduced power consumption.

Some examples of the method, apparatuses, and non-transitory computer-readable medium described herein may further include operations, features, means, or instructions for disabling a baseband circuit associated with the device based on the device operating in the second power mode and enabling an RF front-end circuit associated with the device based on the device operating in the second power mode. By disabling the baseband circuit based on the device operating in the second power mode, the device may experience reduced power consumption. By enabling the RF front-end circuit based on the device operating in the second power mode may support efficient utilization of resources.

In some examples of the method, apparatuses, and non-transitory computer-readable medium described herein, the first active duration includes a fourth generation (4G) wakeup duration and the second active duration includes a fifth generation (5G) discontinuous reception (DRX) duration.

In some examples of the method, apparatuses, and non-transitory computer-readable medium described herein, the first RAT corresponds to a first SIM associated with the device and the second RAT corresponds to a second SIM associated with the device.

In some examples of the method, apparatuses, and non-transitory computer-readable medium described herein, the device includes a multiple-input multiple-output radio transceiver chain enabled to perform spatial multiplexing.

In some examples of the method, apparatuses, and non-transitory computer-readable medium described herein, one or more of the first RAT or the second RAT includes a 4G RAT or a 5G RAT.

DETAILED DESCRIPTION

Figure 1:
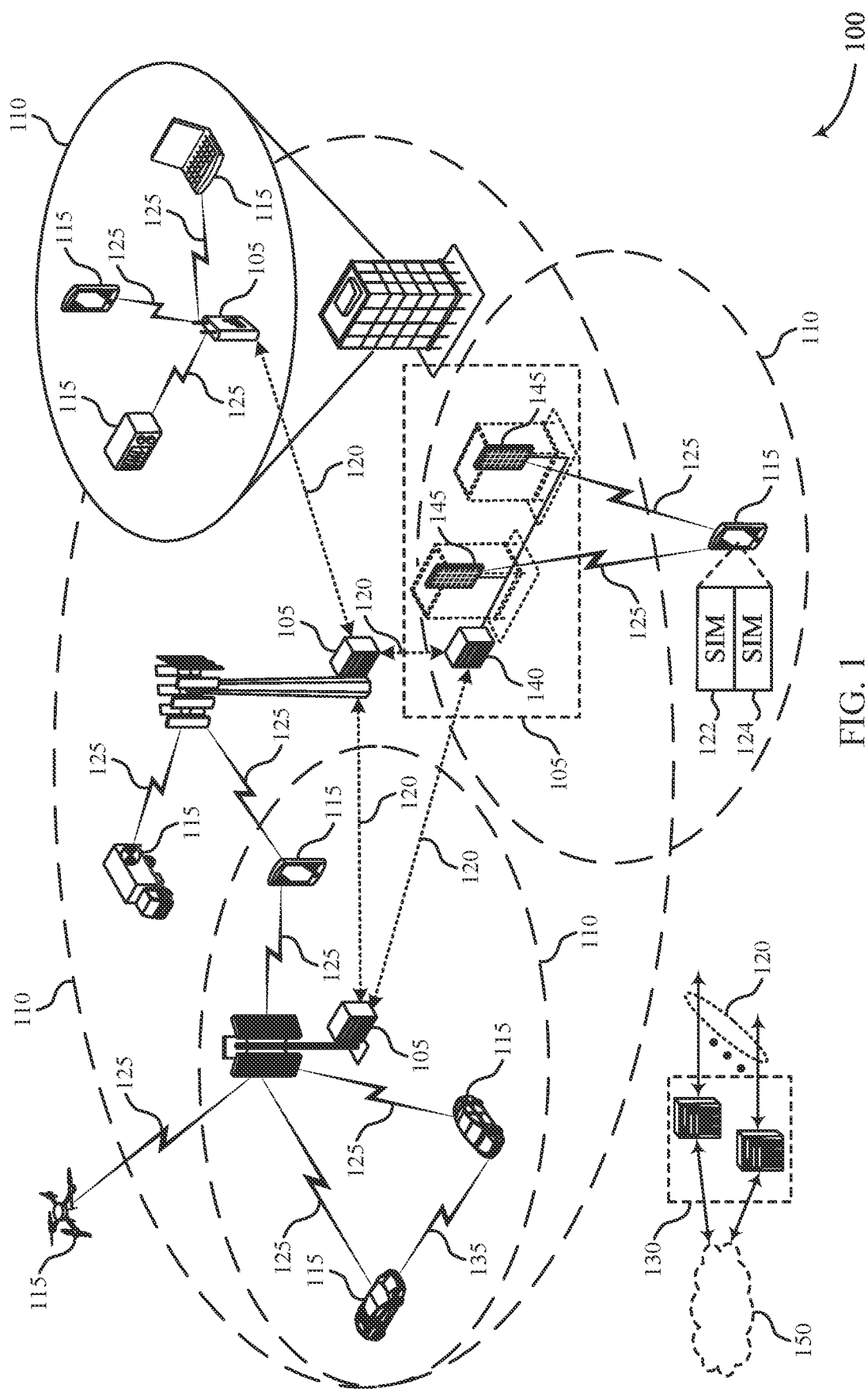
FIG. 1 illustrates an example of a wireless communications system that supports techniques for managing a radio transceiver chain for multiple radio access technologies (RATs) in accordance with various aspects of the present disclosure.

A user equipment (UE) may be configured to support multiple subscriber identity modules (SIMs). Each respective SIM of the multiple SIMs may support a respective radio access technology (RAT). Examples of RATs include fourth generation (4G) such as Long Term Evolution (LTE) or LTE-Advanced (LTE-A), and fifth generation (5G) which may be referred to as new radio (NR) or 5G NR. The UE may be configured with one or more of a dedicated data service (DDS) SIM or a non-dedicated data service (NDDS) SIM. One or more of the DDS SIM or the NDDS SIM may support at least one of the above example RATs. For example, the DDS SIM may support 5G while the NDDS SIM may support 4G. The DDS SIM may enable the UE to support wireless communications with network entities associated with a respective RAT (e.g., 5G), while the NDDS SIM may enable the UE to support wireless communications with network entities associated with a respective RAT (e.g., 4G). The UE may be configured to employ operating modes that reduce power consumption.

The UE may enter, for example, a deep sleep mode to conserve power. While in deep sleep mode, the UE may periodically wake up to check for paging messages from network entities associated with a respective RAT associated with the DDS SIM. If the UE does not detect any paging messages, the UE may return to the deep sleep mode. Likewise, the UE may periodically wake up to check for paging messages from network entities associated with a different respective RAT associated with the NDDS SIM, and may return to deep sleep mode if no paging messages are detected. In some cases, the above periodic transitions between the different operating modes may result in inefficient resource utilization. For example, the above transitions may result in inefficient utilization of antenna elements (e.g., antenna switches) at an RF front-end circuit of the UE. Each time the UE enters deep sleep mode, the UE may deactivate the antenna elements (e.g., for power saving). As such, if the UE wakes from deep sleep mode, the UE may have to reconfigure the antenna elements before checking for paging messages. This reconfiguring of the antenna elements may accrue relatively high processing costs.

Various aspects of the present disclosure relate to techniques for enabling inter SIM coordination to reduce occasions in which the UE reconfigures the antenna elements, thereby reducing processing costs at the UE. The inter SIM coordination may include entering a light sleep mode rather than a deep sleep mode. When entering the light sleep mode, the UE may refrain from deactivating the antenna elements. As a result, the UE may check for paging messages after waking from the light sleep mode without having to reconfigure the antenna elements. The UE may determine to enter the light sleep mode based on identifying an overlap in a time domain between a connected discontinuous reception mode (CDRX) period associated with a respective RAT and a page wake period associated with a different respective RAT. Additionally or alternatively, the UE may determine to adjust the CDRX period associated with the respective RAT based on identifying the overlap in the time domain. In some other examples, the inter SIM coordination may include activating (e.g., waking) the DDS SIM if the UE intends to use the NDDS SIM to check for paging messages from a respective RAT. In some other examples, the inter SIM coordination may include allocating a first subset of the antenna elements to the DDS SIM and a second subset of the antenna elements to the NDDS SIM.

Aspects of the disclosure are initially described in the context of wireless communications systems. Aspects of the disclosure are further illustrated by and described with reference to apparatus diagrams, system diagrams, and flowcharts that relate to techniques for managing a radio transceiver chain for multiple RATs.

FIG. 1 illustrates an example of a wireless communications system 100 that supports techniques for managing a radio transceiver chain for multiple RATs in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum band resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum band, and in some examples the carrier bandwidth may be referred to as a "system bandwidth" of the carrier or the wireless communications system 100. For example, the carrier bandwidth may be one of a number of determined bandwidths for carriers of a RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum band resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of radio frequency spectrum bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed radio frequency spectrum bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may support mitigating conflicts that may occur at a radio transceiver chain associated with the UE 115 when multiple RATs concurrently or simultaneously use the radio transceiver chain. The radio transceiver chain may be a MIMO transceiver performing multi-spatial modulation. The UE 115 may be configured to avoid or mitigate conflicting use of the radio transceiver chain by safeguarding states of registers (also referred to as memory registers) at a radio frequency (RF) front-end circuit of the UE 115, so that one RAT (e.g., third generation (3G), 4G, 5G, among other RATs). does not overwrite such registers when another RAT (e.g., 3G, 4G, 5G, among other RATs) is using the registers.

In some cases, the UE 115 may mitigate such conflicting use of the registers by utilizing resources in the radio transceiver chain. For example, the UE 115 may remove or eliminate contention by adjusting a respective reception or sleep cycle for each respective RAT of the multiple RATs. In some other cases, the UE 115 may be configured with additional hardware or software components to arbitrate or manage the use of such registers. For example, an arbitrator component (e.g., a driver of the radio transceiver chain) associated with the UE 115 may manage the use of the registers at the RF front-end chain, so that the registers cannot be unexpectedly changed by a respective RAT of the multiple RATs using the radio transceiver chain. In other cases, the UE 115 may be configured to use a rule that involves approval of each respective RAT of the multiple RATs to change a respective state of a respective register.

For example, a mechanism is provided that controls changing the power mode of the radio transceiver chain (e.g., baseband circuit or an RF front-end circuit without approval from all RATs using the radio transceiver chain. For example, a communications manager as described herein may serve to prevent powering off the transceiver chain (or component therein) unless all RATs (e.g., a SIM 122 and a SIM 124) approve the change of power mode. For example, if all RATs are concurrently using the radio transceiver chain, the communications manager require that all RATs vote or agree to change the power mode of the transceiver chain. In one example, the communications manager may configure additional switches or registers that have to be set by each of the RATs in order for a power mode of the transceiver chain to be changed. In one example, the communications manager may prevent changing the power mode of the radio transceiver chain from a power on mode to a power off or sleep mode without approval from all RATs.

In the wireless communications system 100, a base station 105 (e.g., a radio access network (RAN)) may be associated with a first RAT (e.g., 5G), while another base station 105 (e.g., another RAN) may be associated with a second RAT (e.g., 4G). A UE 115 may be configured to support multiple SIMs, such as a SIM 122 and a SIM 124. The UE 115 may be capable of performing wireless communication with one or more of the base stations 105 concurrently using one or more of the SIM 122 and the SIM 124. That is, the UE 115 may concurrently communicate with multiple different base stations 105 supporting different RATs.

A UE 115 may be configured to support one or more of a reception cycle (also referred to as an active duration), a sleep cycle (also referred to as an inactive duration) associated with one or more RATs, or a power sleep cycle (also referred to as an inactive duration), such as light sleep cycle for a radio transceiver chain associated with the UE 115 to mitigate changes to one or more registers associated with the UE 115. For example, a UE 115 may support a first RAT (e.g., 4G LTE) and a second RAT (e.g., 5G NR). The first RAT may be associated with a first reception cycle (e.g., a first active duration) and a first sleep cycle (e.g., a first inactive duration). Likewise, the second RAT may be associated with a second reception cycle (e.g., a second active duration) and a second sleep cycle (e.g., a second inactive duration).

In some cases, if an overlap is expected between the first reception cycle and the second reception cycle, the radio transceiver chain associated with the UE 115 may be switched into a partial power saving mode (e.g., a partial sleep mode) instead of a deep power saving mode (e.g., a deep sleep mode). In some other cases, the UE 115 may adjust a duration of the second reception cycle based on an expected overlap between the first reception cycle and the second reception cycle. However, it is to be understood that durations of the first reception cycle and the second reception cycle may be variable. As such, the expected overlap may be an approximation. The UE 115 may also configure the first and second reception cycles such that the second reception cycle begins prior to the first reception cycle and ends after the first reception cycle. Additionally or alternatively, the UE 115 may allocate a first subset of antenna switches (e.g., at the radio transceiver chain of the UE 115) to the first RAT and may allocate a second subset of antenna switches to the second RAT.

Various aspects of the present disclosure may enable the UE 115 to support multiple RATs with greater efficiency, among other benefits. For example, various aspects of the present disclosure may enable the SIM 122 and the SIM 124 to operate the radio transceiver chain of the UE 115 with relatively greater efficiency based on reducing a number of times that the radio transceiver chain is reprogrammed. As a result, the UE 115 may use the SIM 122 and the SIM 124 to support multiple RATs with relatively lower processing costs.

Figure 2:
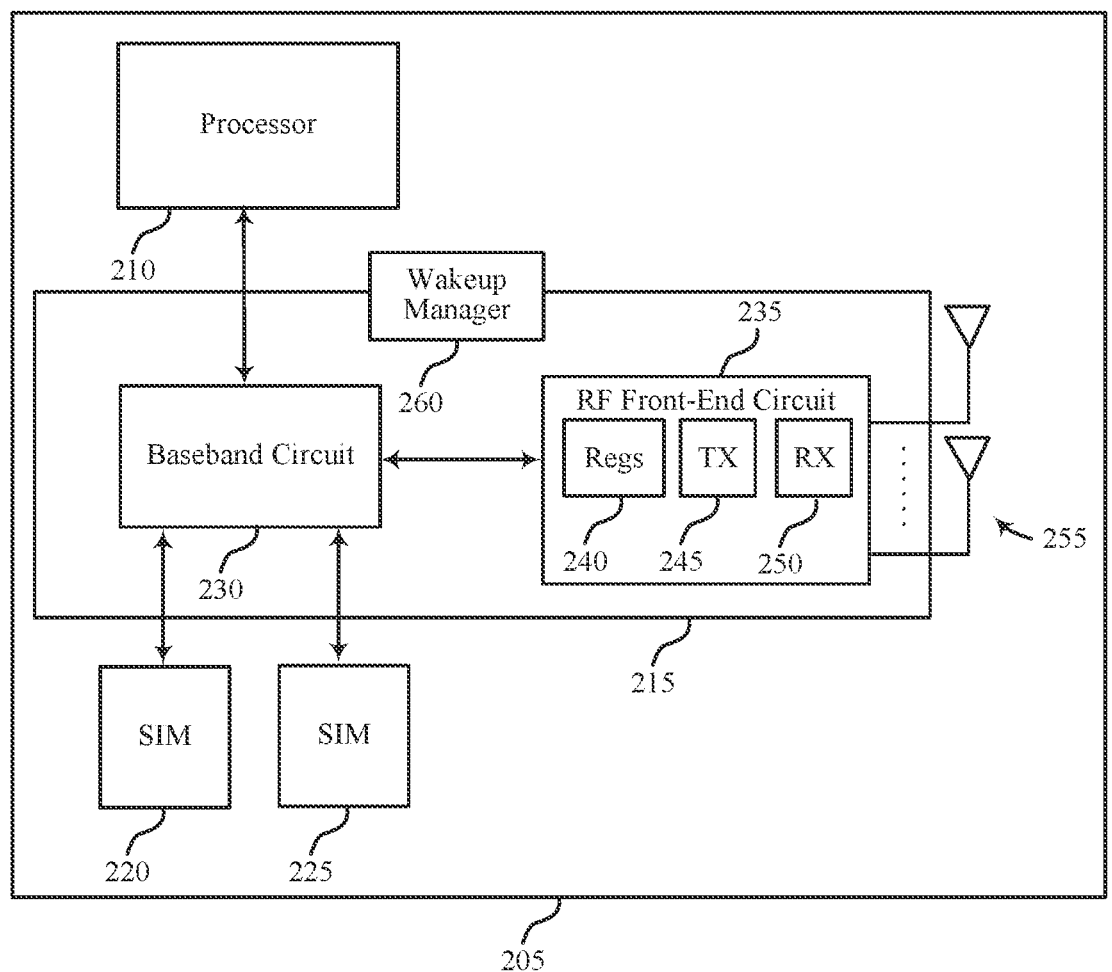
FIG. 2 shows a block diagram of a device that supports techniques for managing a radio transceiver chain for multiple RATs in accordance with various aspects of the present disclosure.

FIG. 2 shows a block diagram 200 of a device 205 that supports techniques for managing a radio transceiver chain for multiple RATs in accordance with various aspects of the present disclosure. The device 205 may be an example of aspects of a UE 115 as described herein. The device 205 may include a processor 210 coupled to a radio transceiver chain 215 and one or more of a SIM 220 and a SIM 225. The SIM 220 (e.g., a DDS SIM) may support wireless communication according to a first RAT (for example, 5G NR). The SIM 225 (e.g., an nDDS SIM) may support wireless communication according to a second RAT (for example, 4G LTE).

The radio transceiver chain 215 may include a baseband circuit 230 coupled to an RF front-end circuit 235. The RF front-end circuit 235 may include one or more of a set of registers 240 (e.g., one or more registers), a transmitter circuit 245, or a receiver circuit 250. One or more components of the RF front-end circuit 235 may be coupled to one or more antennas 255. In some examples, the radio transceiver chain 215 may be a MIMO transceiver performing multi-spatial modulation (e.g., double spatial modulation). The radio transceiver chain 215 may support simultaneous wireless communications in accordance with the first and second RATs.

The device 205 may include a wakeup manager 260 configured to provide scheduling information, including radio transceiver chain resources, for the first and second RATs supported by the device 205. For example, the wakeup manager 260 may track when the first and second RATs are expected or scheduled to wake up for a reception cycle (e.g., an LTE page wake or an NR C-DRX). The wakeup manager 260 may be configured to wake (e.g., power on) the radio transceiver chain 215 based at least in part on one or more periodic occasions or aperiodic occasions.

The set of registers 240 associated with the RF front-end circuit 235 may be configured to track a respective state of the RF front-end circuit 235. In some examples, both the SIM 220 and the SIM 225 may use the set of registers 240. Because the set of registers 240 may be shared between the SIM 220 and the SIM 225, the SIM 220 or the SIM 225 may overwrite one or more parameters (e.g., settings) of the other SIM (e.g., the SIM 220 or the SIM 225). The overwrite may cause a loss of wireless communications for the RAT associated with the other SIM (e.g., the first RAT or the second RAT), which may lead to performance degradation or connection loss for the device 205.

In accordance with various aspects of the present disclosure, the device 205 may reduce a number of times that the set of registers 240 is overwritten based on coordinating usage of the RF front-end circuit 235 between the SIM 220 and the SIM 225. For example, the device 205 may operate the set of registers 240 with greater efficiency based on coordinating reception cycles and sleep cycles of the first and second RATs. Additionally or alternatively, the device 205 may allocate a first subset of the antennas 255 to the SIM 220 and may allocate a second subset of the antennas 255 to the SIM 225. As such, the SIM 220 and the SIM 225 may use the first and second subsets of antennas 255 to communicate according to the first and second RATs without overwriting the set of registers 240.

As an example, the first RAT may utilize a first quantity of receivers and switches, and the second RAT may utilize a second quantity of receivers and switches. The device 205 may allocate receivers and switches from the radio transceiver chain 215 to the first RAT and the second RAT accordingly. For example, the device 205 may configure a first group of receivers and switches at the radio transceiver chain 215 with a setting that is compatible with one or more radio frequency spectrum bands associated with the first RAT (e.g., NR N41). Similarly, the device 205 may configure a second group of receivers and switches at the radio transceiver chain 215 with a setting that is compatible with one or more radio frequency spectrum bands associated with the first RAT (e.g., NR N1) or the second RAT. In some examples, the first group may include a MIMO primary receiver and a MIMO diversity receiver. Likewise, the second group may include a MIMO primary receiver and a MIMO diversity receiver.

In some examples, the device 205 may decrease the number of times that the set of registers 240 is overwritten based on obtaining one or more acknowledgements from the SIM 220 or the SIM 225 prior to altering a power state of the radio transceiver chain 215. For example, the device 205 may refrain from powering off the radio transceiver chain 215 (and overwriting the set of registers 240) until the device 205 receives an acknowledgement from the SIM 220 and the SIM 225. As such, if one or more of the SIM 220 or the SIM 225 are using the set of registers 240, the set of registers 240 may not be overwritten without acknowledgements from the SIM 220 and the SIM 225. In some examples, the device 205 may determine whether to adjust a power level of the radio transceiver chain 215 based on one or more additional switches or registers. For example, the device 205 may refrain from adjusting a power level of the radio transceiver chain 215 or overwriting the set of registers 240 unless the one or more additional switches or registers are set to a specific state.

Decreasing the number of times that the set of registers 240 is overwritten may enable the device 205 to support multiple RATs with greater efficiency and a lower processing overhead, among other benefits. For example, various aspects of the present disclosure may enable the SIM 220 and the SIM 225 to operate the radio transceiver chain 215 of the device 205 with relatively greater efficiency based on reducing a number of times that the radio transceiver chain 215 is powered on or off. As a result, the device 205 may allocate fewer processing resources to reconfiguring the radio transceiver chain 215 and overwriting the set of registers 240. Thus, the device 205 may use the SIM 220, the SIM 225, and the set of registers 240 to communicate according to the first RAT and the second RAT with a relatively higher processing efficiency.

Figure 3:
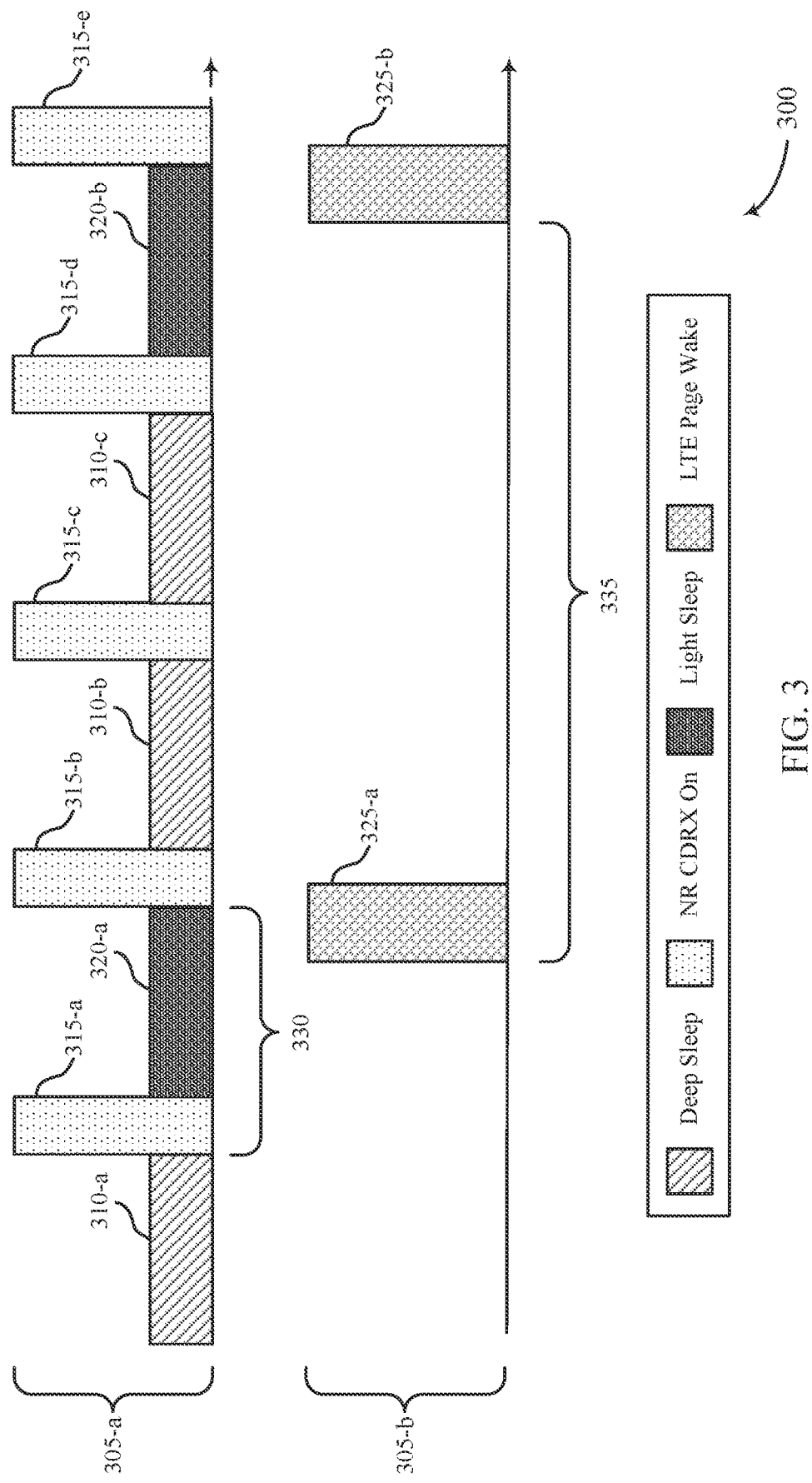
FIGS. 3 through 7 illustrate examples of timelines that support techniques for managing a radio transceiver chain for multiple RATs in accordance with various aspects of the present disclosure.

FIG. 3 illustrates an example of a timeline 300 that supports techniques for managing a radio transceiver chain for multiple RATs in accordance with various aspects of the present disclosure. The timeline 300 may implement aspects of the wireless communications system 100, or may be implemented by aspects of the wireless communications system 100, as described with reference to FIG. 1. For example, the timeline 300 may be based on a configuration by a base station 105, which may be implemented by a UE 115 to provide power saving for the UE 115. Alternatively, the timeline 300 may be based on a configuration by a UE 115, which may be implemented by the UE 115 to promote high reliability and low latency wireless communications associated with various RATs 305.

In the example of FIG. 3, a UE 115 may be configured to support one or more of a reception cycle (also referred to as an active duration) or a sleep cycle (also referred to as an inactive duration) associated with various RATs. The UE 115 may also be configured to support a power sleep cycle (also referred to as an inactive duration) for a radio transceiver chain associated with the UE 115. The UE 115 may use the power sleep cycle to mitigate changes to one or more registers associated with the UE 115. The UE 115 may support a first RAT 305-b (e.g., 4G LTE) and a second RAT 305-a (e.g., 5G NR). The first RAT 305-b may be associated with first reception cycles 325 (e.g., first active durations) and first sleep cycles (e.g., first inactive durations, not shown). Likewise, the second RAT 305-a may be associated with second reception cycles 315 (e.g., second active durations) and second sleep cycles (e.g., second inactive durations). The second sleep cycles associated with the second RAT may include light sleep cycles 320 and deep sleep cycles 310. In some examples, a duration 335 between the first reception cycles 325 may be equal to a first value (e.g., 640 ms) and a duration 330 between the second reception cycles 315 may be equal to a second value (e.g., 160 ms). For example, the UE 115 may active one or more timers, which may enable the UE 115 to monitor wireless communication associated with one or more of the first RAT 305-b (e.g., 4G LTE) or the second RAT 305-a (e.g., 5G NR). The one or more timers may be indicative of the duration 335 between the first reception cycles 325 (e.g., 640 ms)), or the duration 330 between the second reception cycles 315 (e.g., second value (e.g., 160 ms)).

The UE 115 may receive, from a base station 105, a semi-static configuration (e.g., via an RRC configuration message) indicating one or more of the first reception cycles, the first sleep cycles, the second reception cycles, or the second sleep cycles. For example, one or more RRC information elements (IEs) may indicate one or more of the first reception cycles, the first sleep cycles, the second reception cycles, or the second sleep cycles for each respective RAT. Additionally or alternatively, the UE 115 may receive, from a base station 105, a dynamic configuration (e.g., a DCI or a medium access control-control element (MAC-CE)) indicating one or more of the first reception cycles, the first sleep cycles, the second reception cycles, or the second sleep cycles. For example, one or more IEs of a DCI or a MAC-CE may indicate one or more RRC information elements (IEs) may indicate one or more of the first reception cycles, the first sleep cycles, the second reception cycles, or the second sleep cycles for each respective RAT.

A UE 115 may determine a presence or an absence of an overlap between one or more of a reception cycle or a sleep cycle based at least in part on one or more of the semi-static configuration or a dynamic configuration. In some cases, if an overlap is expected between a first reception cycle 325-a and a leading edge of a second reception cycle 315-b, the radio transceiver chain associated with the UE 115 may switch into a light sleep cycle 320-a (e.g., a partial sleep mode) instead of a deep sleep cycle 310. Likewise, if an overlap is expected between a first reception cycle 325-b and a leading edge of a second reception cycle 315-e, the radio transceiver chain associated with the UE 115 may switch into a light sleep cycle 320-b rather than a deep sleep cycle 310. In some other cases, if no overlap is expected between the first reception cycles 325 and the second reception cycles 315, the radio transceiver chain associated with the UE 115 may switch into deep sleep cycles 310. For example, the radio transceiver chain associated with the UE 115 may enter a deep sleep cycle 310-a if there is no expected overlap between the first reception cycle 325-a and the second reception cycle 315-a. Similarly, the radio transceiver chain associated with the UE 115 may enter a deep sleep cycle 310-b and a deep sleep cycle 310-c if the first reception cycles 325 are not expected to overlap with the second reception cycle 315-c or the second reception cycle 315-d, respectively.

In some examples, the UE 115 may detect an overlap between the first reception cycle 325-a and the second reception cycle 315-b based at least in part on determining that a leading edge (e.g., a beginning portion) of the second reception cycle 315-b (e.g., an NR C-DRX active duration) falls inside the first reception cycle 325-a (e.g., an LTE page wakeup duration), as shown in the example of FIG. 3. In some other examples, the UE 115 may detect an overlap between a first reception cycle 325 and a second reception cycles 315 based on determining that a trailing edge (e.g., an ending portion) of the second reception cycle 315 falls inside the first reception cycle 325, as described with reference to FIG. 4. In other examples, the UE 115 may detect an overlap between a first reception cycle 325 and a second reception cycle 315 based on determining that both a leading edge and a trailing edge of a second reception cycle 315 fall inside a first reception cycle 325, as described with reference to FIG. 5.

The timeline 300 may illustrate an example of a leading edge overlap detection between some of the first reception cycles 325 and some of the second reception cycles 315. In some examples, a wakeup manager at the UE 115 may determine that a leading edge of the second reception cycle 315-b overlaps with the first reception cycle 325-a. In such examples, the wakeup manager may configure a radio transceiver chain of the UE 115 to enter the light sleep cycle 320-a prior to the second reception cycle 315-b. While in the light sleep cycle 320-a, a first part (e.g., a baseband processing circuit) of the radio transceiver chain may be inactive and a second part (e.g., an RF front-end circuit) of the radio transceiver chain may be active. That is, the wakeup manager may not disable RF-front end circuit switches based on entering the light sleep cycle 320-a. As such, the wakeup manager may not re-program RF front-end circuit switches after exiting the light sleep cycle 320-a.

In other examples, if there is no expected overlap between the first reception cycles 325 and the second reception cycles 315, the wakeup manager may configure the radio transceiver chain of the UE 115 to enter a deep sleep cycle 310.

For example, the wakeup manager may determine that the second reception cycle 315-*c* does not overlap with the first reception cycle 325-*a* or the first reception cycle 325-*b* and may configure the radio transceiver chain of the UE 115 to enter the deep sleep cycle 310-*b* prior to the second reception cycle 315-*c*. While in the deep sleep cycle 310-*b*, both the baseband processing circuit and the RF front-end circuit of the UE 115 may be inactive. That is, the wakeup manager may disable the RF front-end circuit (and one or more switches at the RF front-end circuit) based on entering the deep sleep cycle 310-*b*. As such, the wakeup manager may re-program the RF front-end circuit when exiting the deep sleep cycle 310-*b*.

The switching between deep sleep cycles 310 and light sleep cycles 320 may enable the UE 115 to perform page decoding operations, search and measurement operations, system information block (SIB) reading operations, scanning operations, or a combination thereof with improved efficiency and lower processing costs based on reducing a number of times that the RF front-end circuit is powered on and off.

Figure 4:
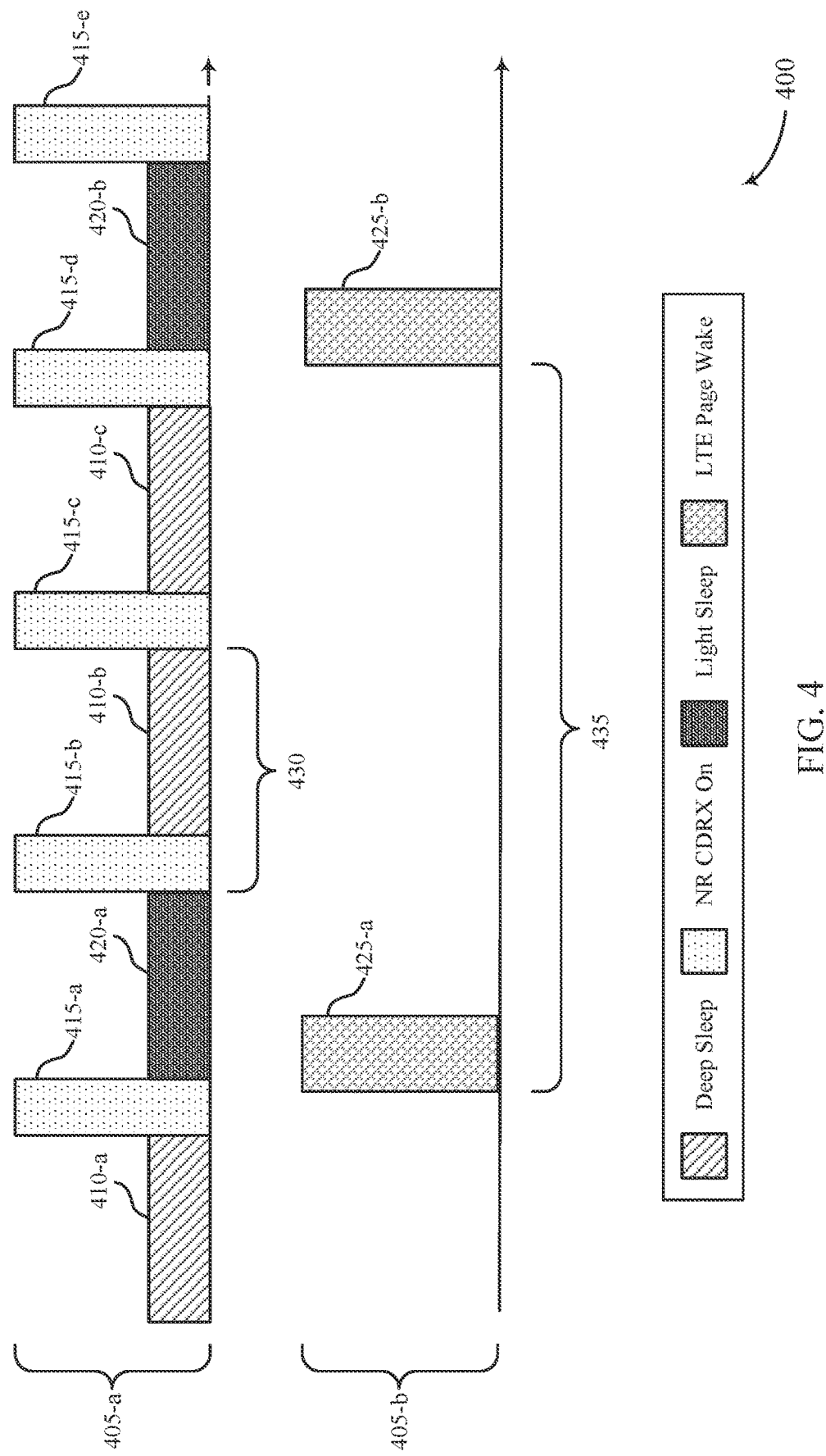

FIG. 4 illustrates an example of a timeline 400 that supports techniques for managing a radio transceiver chain for multiple RATs in accordance with various aspects of the present disclosure. The timeline 400 may implement aspects of the wireless communications system 100, or may be implemented by aspects of the wireless communications system 100, as described with reference to FIG. 1. For example, the timeline 400 may be based on a configuration by a base station 105, which may be implemented by a UE 115 to provide power saving for the UE 115. Alternatively, the timeline 400 may be based on a configuration by a UE 115, which may be implemented by the UE 115 to promote high reliability and low latency wireless communications associated with various RATs.

In the example of FIG. 4, a UE 115 may be configured to support one or more reception cycles (also referred to as an active durations) or sleep cycles (also referred to as inactive durations) associated with various RATs for a radio transceiver chain associated with the UE 115. The UE 115 may mitigate changes to one or more registers associated with the UE 115 based on adjusting active and inactive durations of the radio transceiver chain associated with the UE 115, as described with reference to FIG. 2. The UE 115 may support a first RAT 405-*b* (e.g., 4G LTE) and a second RAT 405-*a* (e.g., 5G NR). The first RAT 405-*b* may be associated with first reception cycles 425 (e.g., first active durations) and first sleep cycles (e.g., first inactive durations, not shown). Likewise, the second RAT 405-*a* may be associated with second reception cycles 415 (e.g., second active durations) and second sleep cycles (e.g., second inactive durations).

The second sleep cycles associated with the second RAT may include light sleep cycles 420 and deep sleep cycles 410. In some examples, a duration 435 between the first reception cycles 425 may be equal to a first value (e.g., 640 ms) and a duration 430 between the second reception cycles 415 may be equal to a second value (e.g., 160 ms). In some cases, if an overlap is expected between a first reception cycle 425-*a* and a second reception cycle 415-*a*, the radio transceiver chain associated with the UE 115 may switch into a light sleep cycle 420-*a* (e.g., a partial sleep mode) instead of a deep sleep cycle 410. Likewise, if an overlap is expected between a first reception cycle 425-*b* and a second reception cycle 415-*d*, the radio transceiver chain associated with the UE 115 may switch into a light sleep cycle 420-*b* rather than a deep sleep cycle 410.

In some other cases, if no overlap is expected between the first reception cycles 425 and the second reception cycles 415, the radio transceiver chain associated with the UE 115 may switch into deep sleep cycles 410. For example, the radio transceiver chain associated with the UE 115 may enter a deep sleep cycle 410-*a* if there is no expected overlap between the first reception cycle 425-*a* and preceding second reception cycles (not shown). Likewise, the radio transceiver chain associated with the UE 115 may enter a deep sleep cycle 410-*b* and a deep sleep cycle 410-*c* if the first reception cycles 425 are not expected to overlap with the second reception cycle 415-*b* or the second reception cycle 415-*c*, respectively.

In some examples, the UE 115 may detect an overlap between the first reception cycles 425 and the second reception cycles 415 based at least in part on determining that a leading edge of a second reception cycle 415 (e.g., an NR C-DRX active duration) fall inside a first reception cycle 425 (e.g., an LTE page wakeup duration), as described in FIG. 3. In the example of FIG. 4, the UE 115 may detect an overlap between a first reception cycle 425 (e.g., the first reception cycle 425-*a*) and a second reception cycle 415 (e.g., the second reception cycle 415-*a*) based on determining that a trailing edge of the second reception cycle 415 falls inside the first reception cycle 425. In other examples, the UE 115 may detect an overlap between a first reception cycle 425 and a second reception cycle 415 based on determining that both a leading edge and a trailing edge of the second reception cycle 415 fall inside the first reception cycle 425, as described with reference to FIG. 5.

The timeline 400 may illustrate an example of a trailing edge overlap detection between some of the first reception cycles 425 and some of the second reception cycles 415. As an example, a wakeup manager at the UE 115 may determine that a trailing edge of the second reception cycle 415-*a* overlaps with the first reception cycle 425-*a*. In such examples, the wakeup manager may configure a radio transceiver chain of the UE 115 to enter the light sleep cycle 420-*a* after the second reception cycle 415-*a*. While in the light sleep cycle 420-*a*, a first part (e.g., a baseband processing circuit) of the radio transceiver chain may be inactive and a second part (e.g., an RF front-end circuit) of the radio transceiver chain may be active. Keeping part of the radio transceiver chain active during light sleep cycles 420 may reduce a number of times that registers of the radio transceiver chain are overwritten. As a result, the UE 115 may allocate relatively fewer processing resources to configuring the registers.

In other examples, if there is no expected overlap between the first reception cycles 425 and a second reception cycle 415 (e.g., a second reception cycle 415-*e*), the wakeup manager may configure the radio transceiver chain of the UE 115 to enter a deep sleep cycle 410. For example, the wakeup manager may determine that the second reception cycle 415-*c* does not overlap with the first reception cycle 425-*a* or the first reception cycle 425-*b* and may configure the radio transceiver chain of the UE 115 to enter the deep sleep cycle 410-*c* after the second reception cycle 415-*c*. While in the deep sleep cycle 410-*c*, both the baseband processing circuit and the RF front-end circuit of the UE 115 may be inactive. Switching between deep sleep cycles 410 and light sleep cycles 420 may enable the UE 115 to perform page decoding operations (e.g., for DDS SIMs and nDDS SIMs), search and measurement operations, SIB reading operations, scanning operations, or a combination thereof with improved efficiency and lower processing costs based on reducing a number of times that the RF front-end circuit is powered on and off.

Figure 5:
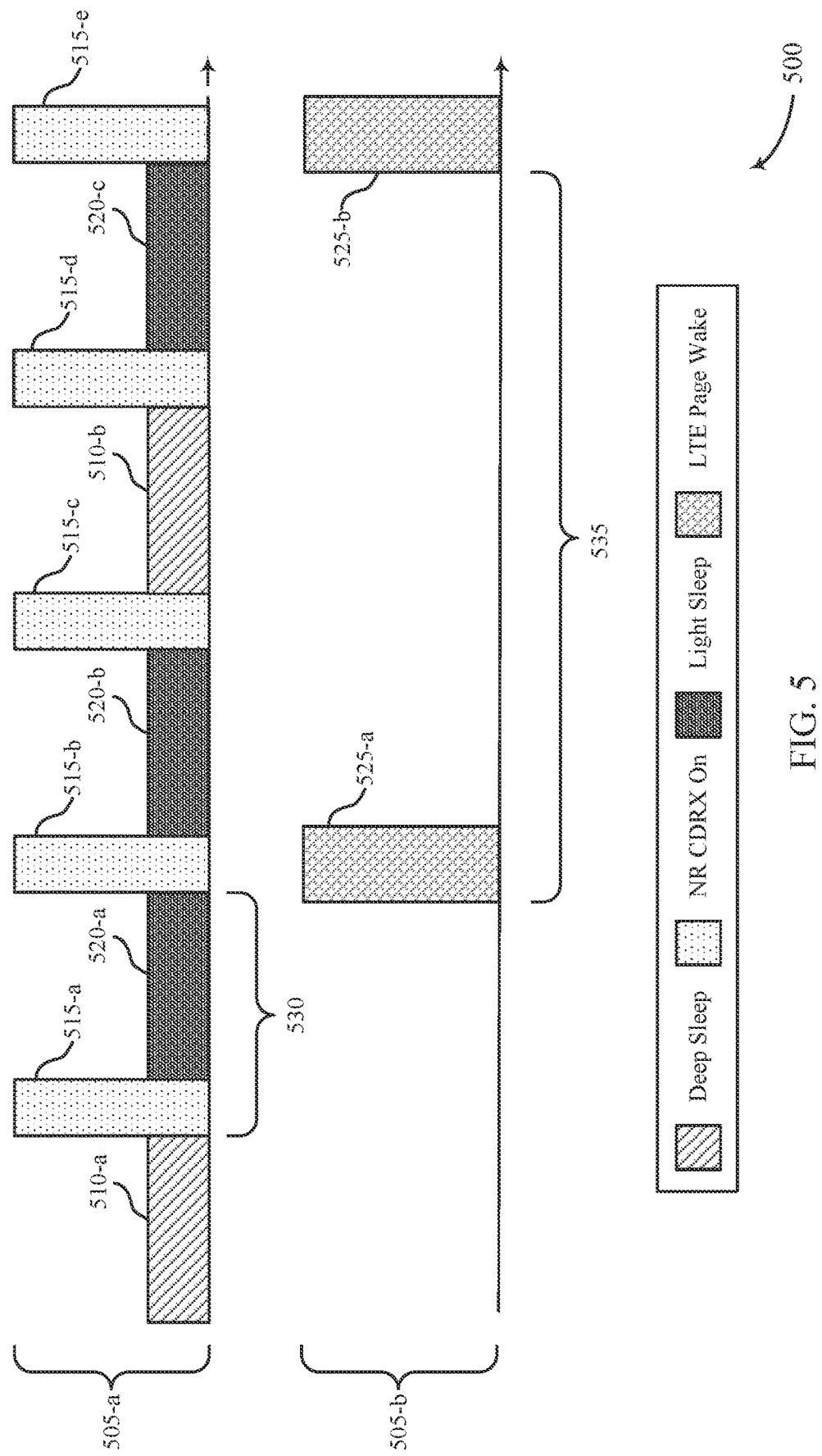

FIG. 5 illustrates an example of a timeline 500 that supports techniques for managing a radio transceiver chain for multiple RATs in accordance with various aspects of the present disclosure. The timeline 500 may implement aspects of the wireless communications system 100, or may be implemented by aspects of the wireless communications system 100, as described with reference to FIG. 1. For example, the timeline 500 may be based on a configuration by a base station 105, which may be implemented by a UE 115 to provide power saving for the UE 115. Alternatively, the timeline 500 may be based on a configuration by a UE 115, which may be implemented by the UE 115 to promote high reliability and low latency wireless communications associated with various RATs.

In the example of FIG. 5, a UE 115 may be configured to support one or more of a reception cycle (also referred to as an active duration) or a sleep cycle (also referred to as an inactive duration) associated with one or more RATs. The UE 115 may also be configured to support a power sleep cycle (also referred to as an inactive duration) for a radio transceiver chain associated with the UE 115. The UE 115 may use the power sleep cycle to mitigate changes to one or more registers associated with the UE 115, as described with reference to FIG. 2. For example, the UE 115 may support a first RAT 505-b (e.g., 4G LTE) and a second RAT 505-a (e.g., 5G NR). The first RAT 505-b may be associated with first reception cycles 525 (e.g., first active durations) and first sleep cycles (e.g., first inactive durations, not shown). Likewise, the second RAT 505-a may be associated with second reception cycles 515 (e.g., second active durations) and second sleep cycles (e.g., second inactive durations). The second sleep cycles may include deep sleep cycles 510 and light sleep cycles 520. In some examples, a duration 535 between the first reception cycles 525 may be equal to a first value (e.g., 640 ms) and a duration 530 between the second reception cycles 515 may be equal to a second value (e.g., 160 ms).

In some cases, if an overlap is expected between the first reception cycles 525 and the second reception cycles 515, the radio transceiver chain associated with the UE 115 may switch into a light sleep cycle 520 (e.g., a partial sleep mode) instead of a deep sleep cycle 510 (e.g., a deep sleep mode). In some examples, the UE 115 may detect an overlap between a first reception cycle 525 and a second reception cycle 515 based at least in part on determining that a leading edge of a second reception cycle 515 (e.g., an NR C-DRX active duration) falls inside a first reception cycle 525 (e.g., an LTE page wakeup duration), as described with reference to FIG. 3. In some other examples, the UE 115 may detect an overlap between a first reception cycle 525 and a second reception cycle 515 based at least in part on determining that a trailing edge of a second reception cycle 515 falls inside a first reception cycle 525, as described with reference to FIG. 4. In the example of FIG. 5, the UE 115 may detect an overlap between a first reception cycle 525 (e.g., the first reception cycle 525-a) and a second reception cycle 515 (e.g., the second reception cycle 515-b) based at least in part on determining that both a leading edge and a trailing edge of the second reception cycle 515 falls inside the first reception cycle 525.

The timeline 500 may illustrate an example of a full overlap detection between the first reception cycles 525 and the second reception cycles 515. As an example, a wakeup manager at the UE 115 may determine that both a trailing edge and a leading edge of the second reception cycle 515-b overlap with the first reception cycle 525-a. Likewise, the wakeup manager may determine that both a leading edge and a trailing edge of the second reception cycle 515-e overlap with the first reception cycle 525-b. In such examples, the wakeup manager may configure a radio transceiver chain of the UE 115 to enter the light sleep cycle 520-a prior the second reception cycle 515-b (e.g., on the leading edge of the second reception cycle 515-b) and may also configure the radio transceiver chain of the UE 115 to enter the light sleep cycle 520-b after the second reception cycle 515-b (e.g., on the trailing edge of the second reception cycle 515-b). Similarly, the wakeup manager may configure the radio transceiver chain of the UE 115 to enter light sleep cycles 520 (e.g., a light sleep cycle 520-c) before and after the second reception cycle 515-e. While in the light sleep cycle 520-a and the light sleep cycle 520-b, a first portion (e.g., a baseband processing circuit) of the radio transceiver chain may be inactive and a second portion (e.g., an RF front-end circuit) of the radio transceiver chain may be active.

In other examples, if there is no expected overlap between the first reception cycles 525 and a second reception cycle 515 (e.g., a second reception cycle 515-c), the wakeup manager may configure the radio transceiver chain of the UE 115 to enter a deep sleep cycle 510. For example, the wakeup manager may determine that a leading edge of the second reception cycle 515-d does not overlap with the first reception cycle 525-a or the first reception cycle 525-b and may configure the radio transceiver chain of the UE 115 to enter the deep sleep cycle 510-b prior to the second reception cycle 515-d. Similarly, the wakeup manager may determine that a leading edge of the second reception cycle 515-a does not overlap with the first reception cycles 525 and may configure the UE 115 to enter a deep sleep cycle 510-a. While in the deep sleep cycle 510-a or the deep sleep cycle 510-b, both the baseband processing circuit and the RF front-end circuit of the UE 115 may be inactive. Switching between deep sleep cycles 510 and light sleep cycles 520 may enable the UE 115 to perform page decoding operations, search and measurement operations, system information block (SIB) reading operations, scanning operations, or a combination thereof with improved efficiency and lower processing costs based on reducing a number of times that the RF front-end circuit is powered on and off.

Figure 6:
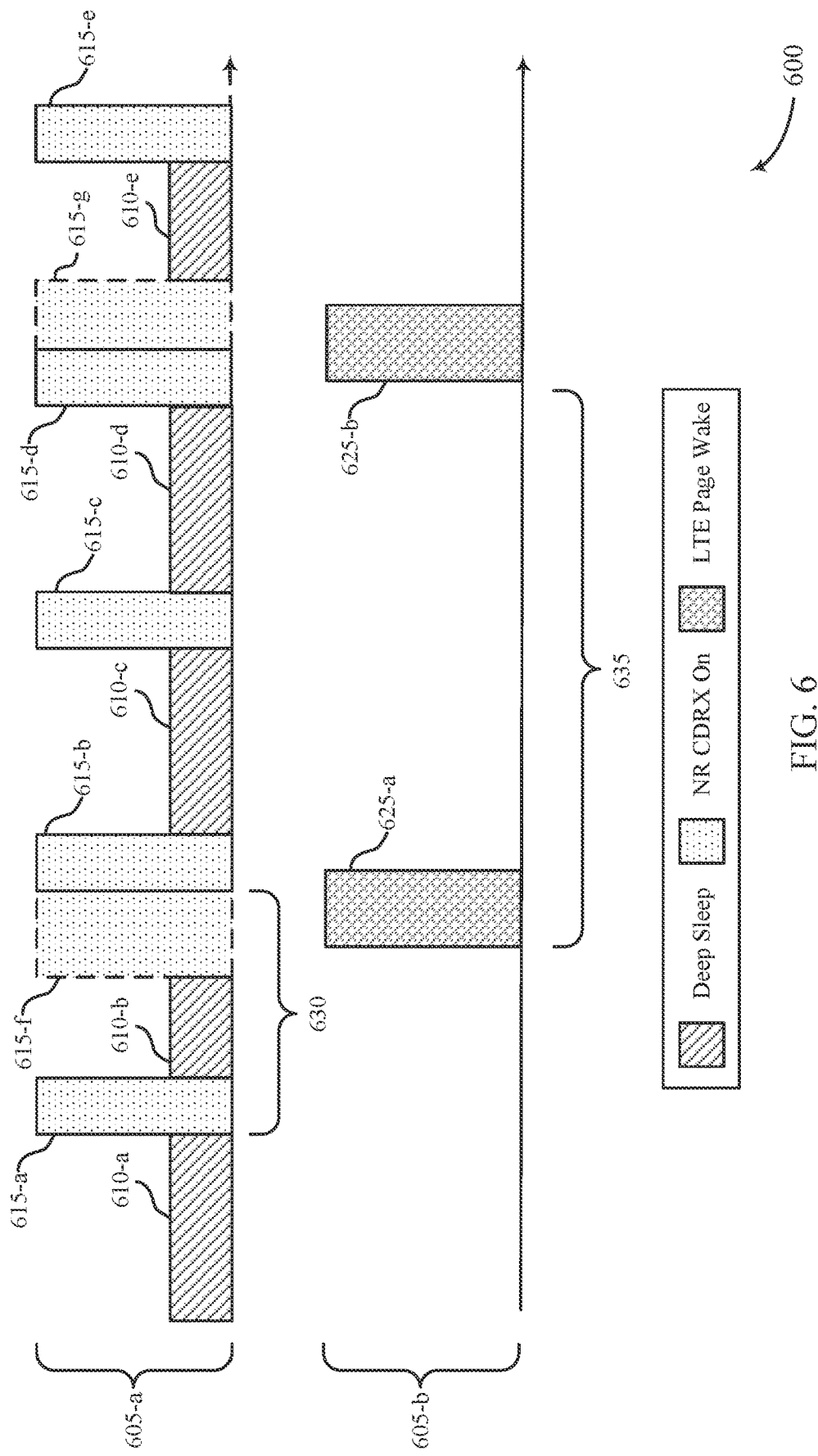

FIG. 6 illustrates an example of a timeline 600 that supports techniques for managing a radio transceiver chain for multiple RATs in accordance with various aspects of the present disclosure. The timeline 600 may implement aspects of the wireless communications system 100, or may be implemented by aspects of the wireless communications system 100, as described with reference to FIG. 1. For example, the timeline 600 may be based on a configuration by a base station 105, which may be implemented by a UE 115 to provide power saving for the UE 115. Alternatively, the timeline 600 may be based on a configuration by a UE 115, which may be implemented by the UE 115 to promote high reliability and low latency wireless communications associated with various RATs.

In the example of FIG. 6, a UE 115 may be configured to support one or more of a reception cycle (also referred to as an active duration) or a sleep cycle (also referred to as an inactive duration) associated with one or more RATs. The UE 115 may also be configured to support a power sleep cycle (also referred to as an inactive duration) for a radio transceiver chain associated with the UE 115. The UE 115 may use the power sleep cycle to mitigate changes to one or more registers associated with the UE 115, as described with reference to FIG. 2.

The UE 115 may support a first RAT 605-*b* (e.g., 4G LTE) and a second RAT 605-*a* (e.g., 5G NR). The first RAT 605-*b* may be associated with first reception cycles 625 (e.g., first active durations) and first sleep cycles (e.g., first inactive durations, not shown). Likewise, the second RAT 605-*a* may be associated with second reception cycles 615 (e.g., second active durations) and deep sleep cycles 610 (e.g., second inactive durations). In some examples, a duration 635 between the first reception cycles 625 may be equal to a first value (e.g., 640 ms) and a duration 630 between the second reception cycles 615 may be equal to a second value (e.g., 160 ms).

In some examples, if a first reception cycle 625-*a* that is associated with the first RAT 605-*b* overlaps (e.g., in the time-domain) with a second reception cycle 615-*b* that is associated with the second RAT 605-*a*, SIMs associated with the first RAT 605-*b* and the second RAT 605-*a* may overwrite one or more common (e.g., shared) registers at a radio transceiver chain of the UE 115. For example, if a first SIM (e.g., an nDDS SIM) associated with the first RAT 605-*b* is using one or more shared registers to monitor for communications according to the first RAT 605-*b* and a second SIM (e.g., a DDS SIM) associated with the second RAT 605-*a* overwrites the shared registers, the UE 115 may experience performance degradation or connection loss for the first RAT 605-*b*.

The UE 115 may be configured to mitigate overwriting one or more registers of an RF front-end circuit associated with the UE 115 based on starting a second reception cycle 615 (e.g., a second reception cycle 615-*b*) early or extending a second reception cycle 615 (e.g., a second reception cycle 615-*d*) so as to fully overlap with the first reception cycles 625. For example, the UE 115 may append a second reception cycle 615-*f* to a leading edge of the second reception cycle 615-*b* such that a combination of the second reception cycle 615-*b* and the second reception cycle 615-*f* fully overlaps a first reception cycle 625-*a*. Likewise, the UE 115 may append a second reception cycle 615-*g* to the second reception cycle 615-*d* such that a combination of the second reception cycle 615-*d* and the second reception cycle 615-*g* fully overlaps a first reception cycle 625-*b*.

To extend the second reception cycles 615 such that the second reception cycles 615 fully overlap with the first reception cycles 625, the UE 115 may reduce a duration of the deep sleep cycles 610. For example, the UE 115 may reduce a duration of a deep sleep cycle 610-*b* such that the UE 115 may append the second reception cycle 615-*f* to a leading edge of the second reception cycle 615-*b*. Similarly, the UE 115 may reduce a duration of a deep sleep cycle 610-*e* such that the UE 115 may append the second reception cycle 615-*g* to a trailing edge of the second reception cycle 615-*d*. In other examples, the UE 115 may not adjust some of the deep sleep cycles 610. For example, the UE 115 may not shorten a deep sleep cycle 610-*a*, a deep sleep cycle 610-*c*, or a deep sleep cycle 610-*d* because these deep sleep cycles 610 may not overlap with the first reception cycles 625. Likewise, the UE 115 may not extend a second reception cycle 615-*a*, a second reception cycle 615-*c*, or a second reception cycle 615-*e* because these second reception cycles 615 may not overlap with the first reception cycles 625.

In some examples, a wakeup manager of the UE 115 may determine that the first reception cycle 625-*a* overlaps with a leading edge of the second reception cycle 615-*b* and the first reception cycle 625-*b* overlaps with a trailing edge of the second reception cycle 615-*d*. Accordingly, the wakeup manager may append the second reception cycle 615-*f* to the leading edge of the second reception cycle 615-*b* and may append the second reception cycle 615-*g* to the trailing edge of the second reception cycle 615-*d*. Thus, a combined duration of the second reception cycle 615-*b* and the second reception cycle 615-*f* may fully overlap the first reception cycle 625-*a*. Likewise, a combined duration of the second reception cycle 615-*d* and the second reception cycle 615-*g* may fully overlap the first reception cycle 625-*b*.

By fully overlapping (e.g., encapsulating) the first reception cycles 625 via leading edge extension or trailing end extension of the second reception cycles 615, the UE 115 may reduce a number of times that a radio transceiver chain at the UE 115 is powered on and off. As a result, the UE 115 may reduce a number of times that registers associated with the radio transceiver chain are overwritten, which may enable the UE 115 to use the registers with relatively lower processing costs, among other benefits.

Figure 7:
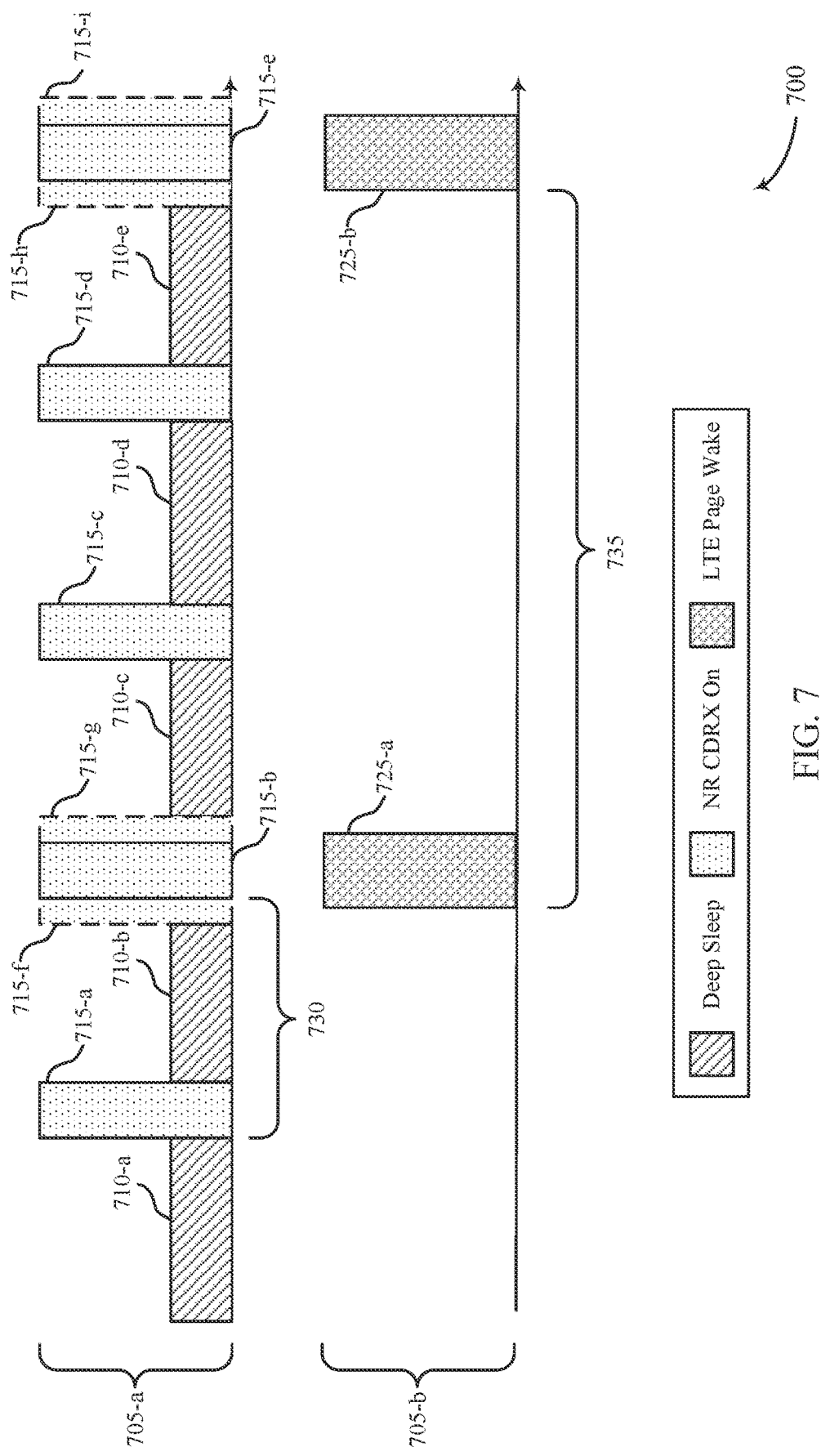

FIG. 7 illustrates an example of a timeline 700 that supports techniques for managing a radio transceiver chain for multiple RATs in accordance with various aspects of the present disclosure. The timeline 700 may implement aspects of the wireless communications system 100, or may be implemented by aspects of the wireless communications system 100, as described with reference to FIG. 1. For example, the timeline 700 may be based on a configuration by a base station 105, which may be implemented by a UE 115 to provide power saving for the UE 115. Alternatively, the timeline 700 may be based on a configuration by a UE 115, which may be implemented by the UE 115 to promote high reliability and low latency wireless communications associated with various RATs.

A UE 115 may be configured to support one or more of a reception cycle (also referred to as an active duration) or a sleep cycle (also referred to as an inactive duration) associated with one or more RATs 705. The UE 115 may also be configured to support a power sleep cycle (also referred to as an inactive duration) for a radio transceiver chain associated with the UE 115. The UE 115 may use the power sleep cycle to mitigate changes to one or more registers associated with the UE 115 as described with reference to FIG. 2.

The UE 115 may support a first RAT 705-*b* (e.g., 4G LTE) and a second RAT 705-*a* (e.g., 5G NR). The first RAT 705-*b* may be associated with first reception cycles 725 (e.g., first active durations) and first sleep cycles (e.g., first inactive durations, not shown). Likewise, the second RAT 705-*a* may be associated with second reception cycles 715 (e.g., second active durations) and deep sleep cycles 710 (e.g., second inactive durations). In some examples, a duration 735 between the first reception cycles 725 may be equal to a first value (e.g., 640 ms) and a duration 730 between the second reception cycles 715 may be equal to a second value (e.g., 160 ms).

In some cases, if an overlap is expected between a first reception cycle 725 and a second reception cycle 715, the radio transceiver chain associated with the UE 115 may switch into a partial power saving mode (e.g., a partial sleep mode) instead of a deep sleep cycle 710, as described with reference to FIGS. 3 through 5. In some examples, if the first reception cycles 725 associated with the first RAT 705-*b* overlap (e.g., in the time-domain) with the second reception cycles 715 associated with the second RAT 705-*a*, SIMs corresponding to the first RAT 705-*b* and the second RAT 705-*a* may overwrite one or more registers at the UE 115, which may disrupt wireless communications at the UE 115. For example, if a first SIM associated with the first RAT 705-*b* is using one or more registers to monitor for communications according to the first RAT 705-*b* and a second SIM associated with the second RAT 705-*a* overwrites the one or more registers, the UE 115 may experience performance degradation or connection loss for the first RAT 705-*b*.

In the example of FIG. 7, the UE 115 may be configured to mitigate overwriting one or more registers of an RF front-end circuit associated with the UE 115 based on extending both a leading edge and a trailing edge of a second reception cycle 715 (e.g., a second reception cycle 715-*b*) so as to fully overlap with a first reception cycle 725 (e.g., a first reception cycle 725-*a*). For example, the UE 115 may extend a leading edge of the second reception cycle 715-*b* with a second reception cycle 715-*f* and may extend a trailing edge of the second reception cycle 715-*b* with a second reception cycle 715-*g*. If the first reception cycle 725-*a* is fully overlapped by a combination of the second reception cycle 715-*b*, the second reception cycle 715-*f*, and the second reception cycle 715-*g*, the likelihood of overwriting register states in the RF front-end circuit of the UE 115 may be reduced. Similarly, the UE 115 may extend the second reception cycle 715-*e* with a second reception cycle 715-*h* and a second reception cycle 715-*i* such that a combination of the second reception cycle 715-*e*, the second reception cycle 715-*h*, and the second reception cycle 715-*i* fully overlaps a first reception cycle 725-*b*.

To extend the second reception cycles 715 such that the second reception cycles 715 fully overlap with the first reception cycles 725, the UE 115 may reduce a duration of the deep sleep cycles 710. For example, the UE 115 may reduce a duration of a deep sleep cycle 710-*b* and a duration of a deep sleep cycle 710-*c* such that the UE 115 may append the second reception cycle 715-*f* and the second reception cycle 715-*g* to the second reception cycle 715-*b*. Similarly, the UE 115 may reduce a duration of a deep sleep cycle 710-*e* such that the UE 115 may append the second reception cycle 715-*h* and the second reception cycle 715-*i* to the second reception cycle 715-*e*. In other examples, the UE 115 may not adjust some of the deep sleep cycles 710. For example, the UE 115 may not shorten a deep sleep cycle 710-*a* or a deep sleep cycle 710-*d* because these deep sleep cycles 710 may not overlap with the first reception cycles 725. Likewise, the UE 115 may not extend a second reception cycle 715-*a*, a second reception cycle 715-*c*, or a second reception cycle 715-*d* because these second reception cycles 715 may not overlap with the first reception cycles 725.

By fully overlapping (e.g., encapsulating) the first reception cycles 725 via leading edge extension or trailing end extension of the second reception cycles 715, the UE 115 may reduce a number of times that a radio transceiver chain at the UE 115 is powered on and off. As a result, the UE 115 may reduce a number of times that registers associated with the radio transceiver chain are overwritten, which may enable the UE 115 to use the registers with relatively lower processing costs, among other benefits.

Figure 8:
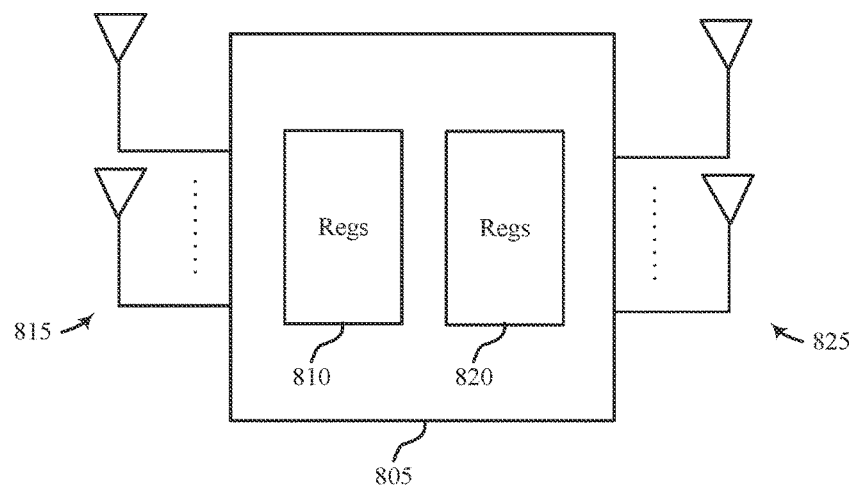
FIG. 8 shows a block diagram of a device that supports techniques for managing a radio transceiver chain for multiple RATs in accordance with various aspects of the present disclosure.

FIG. 8 shows a block diagram 800 of a device 805 that supports techniques for managing a radio transceiver chain for multiple RATs in accordance with various aspects of the present disclosure. The device 805 may be an example of aspects of a UE 115 as described herein. In some examples, the device 805 may be an RF front-end circuit. The device 805 may include a set of registers 810 that may be associated with a set of antennas 815. Additionally or alternatively, the device 805 may include a set of registers 820 that may be associated with a set of antennas 825. The device 805 may support multiple RATs, which may include 2G, 3G, 4G, 5G, 6G or any other type of RAT.

In some examples, a SIM associated with the device 805 may use data stored in the registers 810 and the registers 820 to perform wireless communications while the device 805 is in a reception cycle (e.g., a connected state). In some examples, however, the device 805 may enter a deep sleep cycle. While in the deep sleep cycle, the device 805 may overwrite one or more of the registers 810 or the registers 820. As a result, data stored in the registers 810 and the registers 820 may be lost. Thus, the SIM associated with the device 805 may be unable to access the data that was previously stored in the registers 810 and the registers 820, which may disrupt wireless communications at the device 805. To mitigate such overwrites, the device 805 may enter a light sleep cycle rather than a deep sleep cycle, as described with reference to FIGS. 3 through 5. While in the light sleep cycle, the device 805 may refrain from overwriting the registers 810 or the registers 820. Additionally or alternatively, the device 805 may extend a duration of the reception cycle such that the registers 810 and the registers 820 are not overwritten, as described with reference to FIGS. 6 and 7.

In some examples, the set of registers 810 associated with the set of antennas 815 may correspond to one type of RAT (e.g., 4G), while the set of registers 820 associated with a set of antennas 825 may correspond to another type of RAT (e.g., 5G). The device 805 may support associating one or more of the set of registers 810 or the set of registers 820 to one or more of the set of antennas 815 or the set of antennas 825. For paging and C-DRX reception, the device 805 may be configured to use a subset of the antennas. This pre-association of registers and subset of antennas may enable dynamic allocation of one or more of available registers or set of antennas to reception cycles for different RATs, while mitigating conflicts for the RF front-end circuit.

Figure 9:
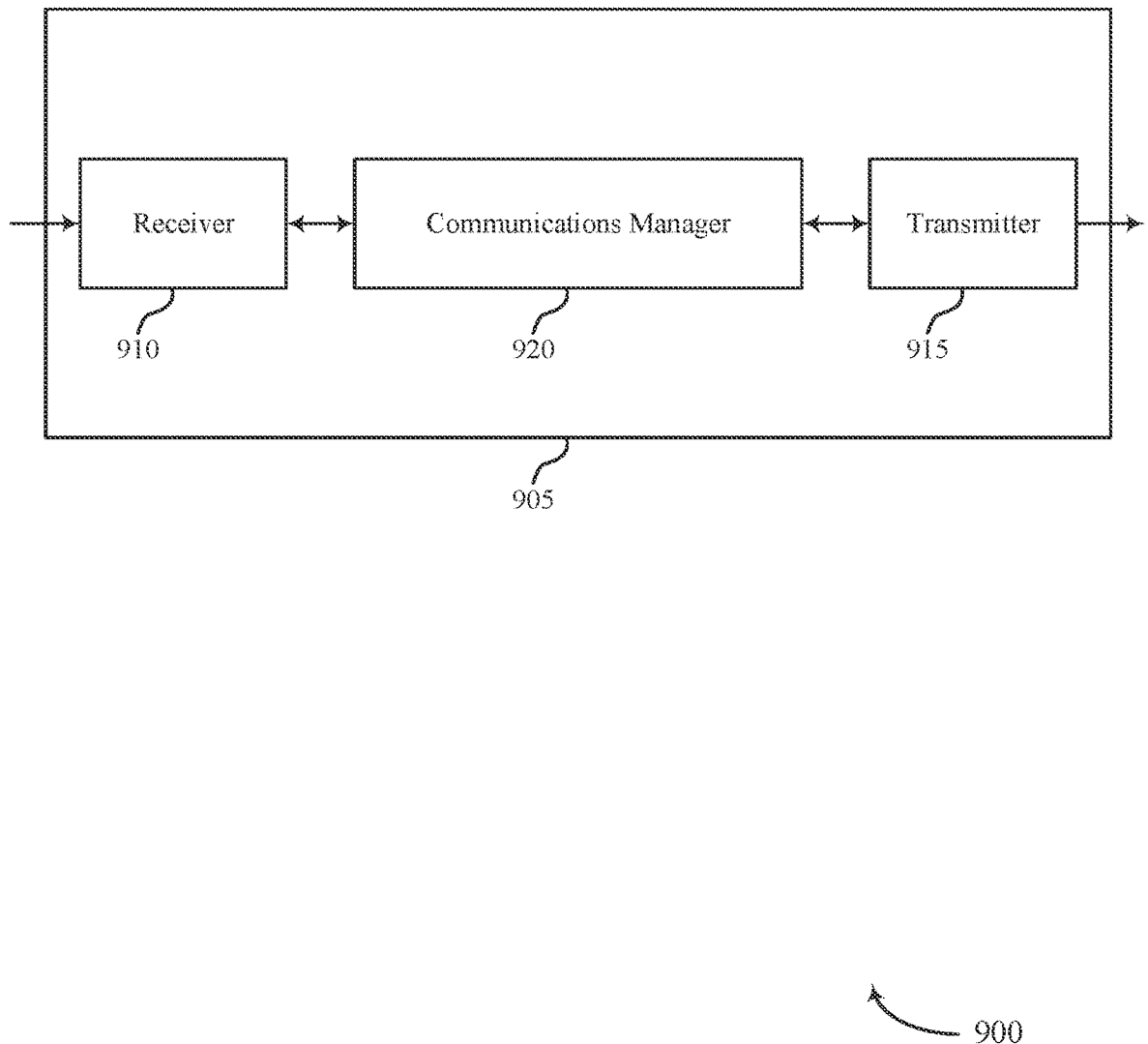
FIGS. 9 and 10 show block diagrams of devices that support techniques for managing a radio transceiver chain for multiple RATs in accordance with various aspects of the present disclosure.

FIG. 9 shows a block diagram 900 of a device 905 that supports techniques for managing a radio transceiver chain for multiple RATs in accordance with various aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing a radio transceiver chain for multiple RATs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing a radio transceiver chain for multiple RATs). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for managing a radio transceiver chain for multiple RATs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 in accordance with examples as disclosed herein. For example, the communications manager 920 may be configured as or otherwise support a means for monitoring a channel for wireless communication associated with a first RAT during one or more of a first active duration or a first inactive duration, the device 905 operating in a first power mode during the first inactive duration. The communications manager 920 may be configured as or otherwise support a means for monitoring the channel for wireless communication associated with a second RAT during one or more of a second active duration or a second inactive duration, the device 905 operating during the second inactive duration in one or more of the first power mode based on an absence of an overlap between the first active duration and one or more of the second active duration or a third active duration, or a second power mode based on the overlap between the first active duration and one or more of the second active duration or the third active duration. The communications manager 920 may be configured as or otherwise support a means for operating the device 905 according to the first power mode or the second power mode based on the monitoring of the channel associated with the first RAT and the second RAT.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption.

Figure 10:
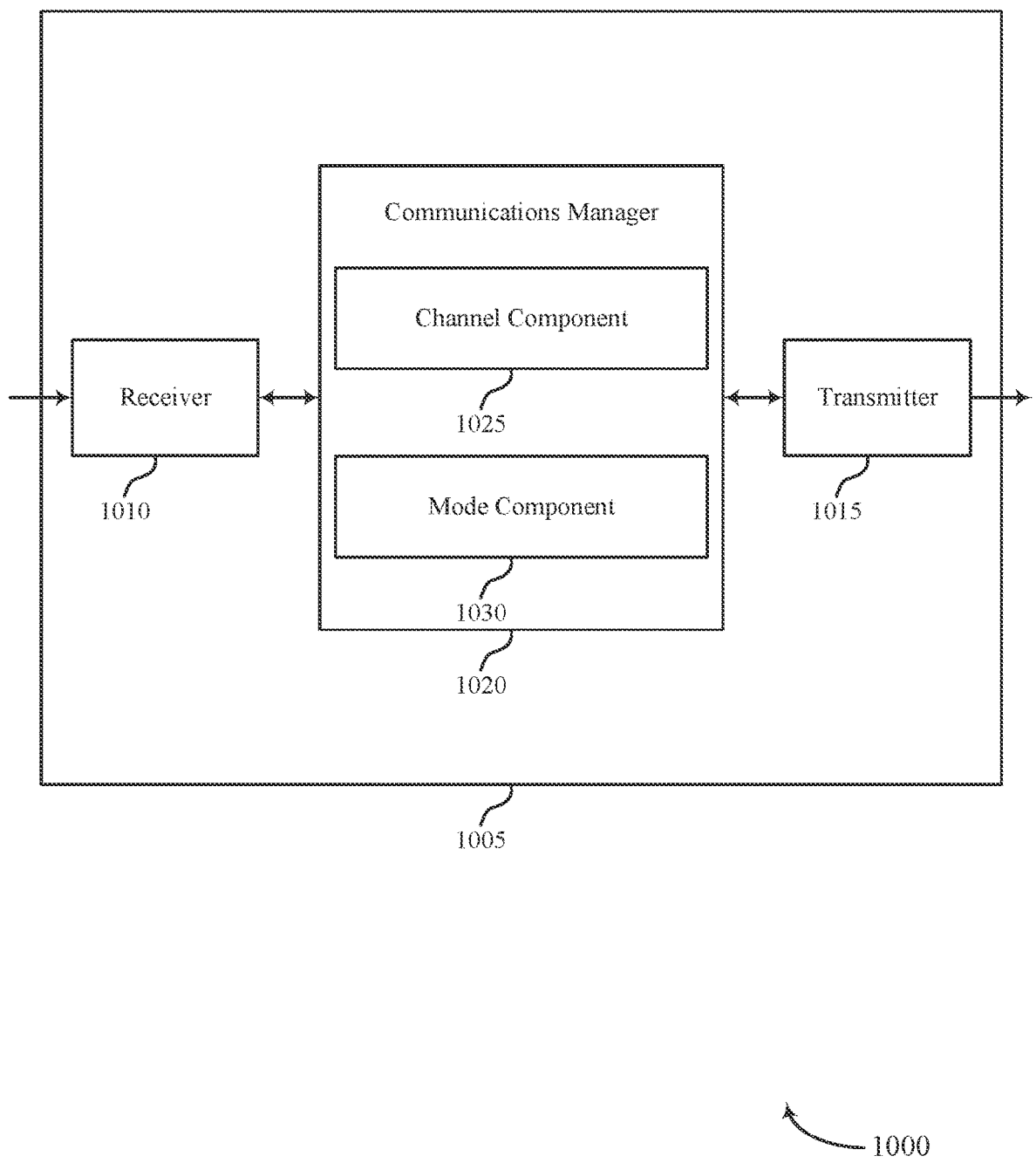

FIG. 10 shows a block diagram 1000 of a device 1005 that supports techniques for managing a radio transceiver chain for multiple RATs in accordance with various aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing a radio transceiver chain for multiple RATs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing a radio transceiver chain for multiple RATs). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for managing a radio transceiver chain for multiple RATs as described herein. For example, the communications manager 1020 may include a channel component 1025 a mode component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 in accordance with examples as disclosed herein. The channel component 1025 may be configured as or otherwise support a means for monitoring a channel for wireless communication associated with a first RAT during one or more of a first active duration or a first inactive duration, the device 1005 operating in a first power mode during the first inactive duration. The channel component 1025 may be configured as or otherwise support a means for monitoring the channel for wireless communication associated with a second RAT during one or more of a second active duration or a second inactive duration, the device 1005 operating during the second inactive duration in one or more of the first power mode based on an absence of an overlap between the first active duration and one or more of the second active duration or a third active duration, or a second power mode based on the overlap between the first active duration and one or more of the second active duration or the third active duration. The mode component 1030 may be configured as or otherwise support a means for operating the device 1005 according to the first power mode or the second power mode based on the monitoring of the channel associated with the first RAT and the second RAT.

Figure 11:
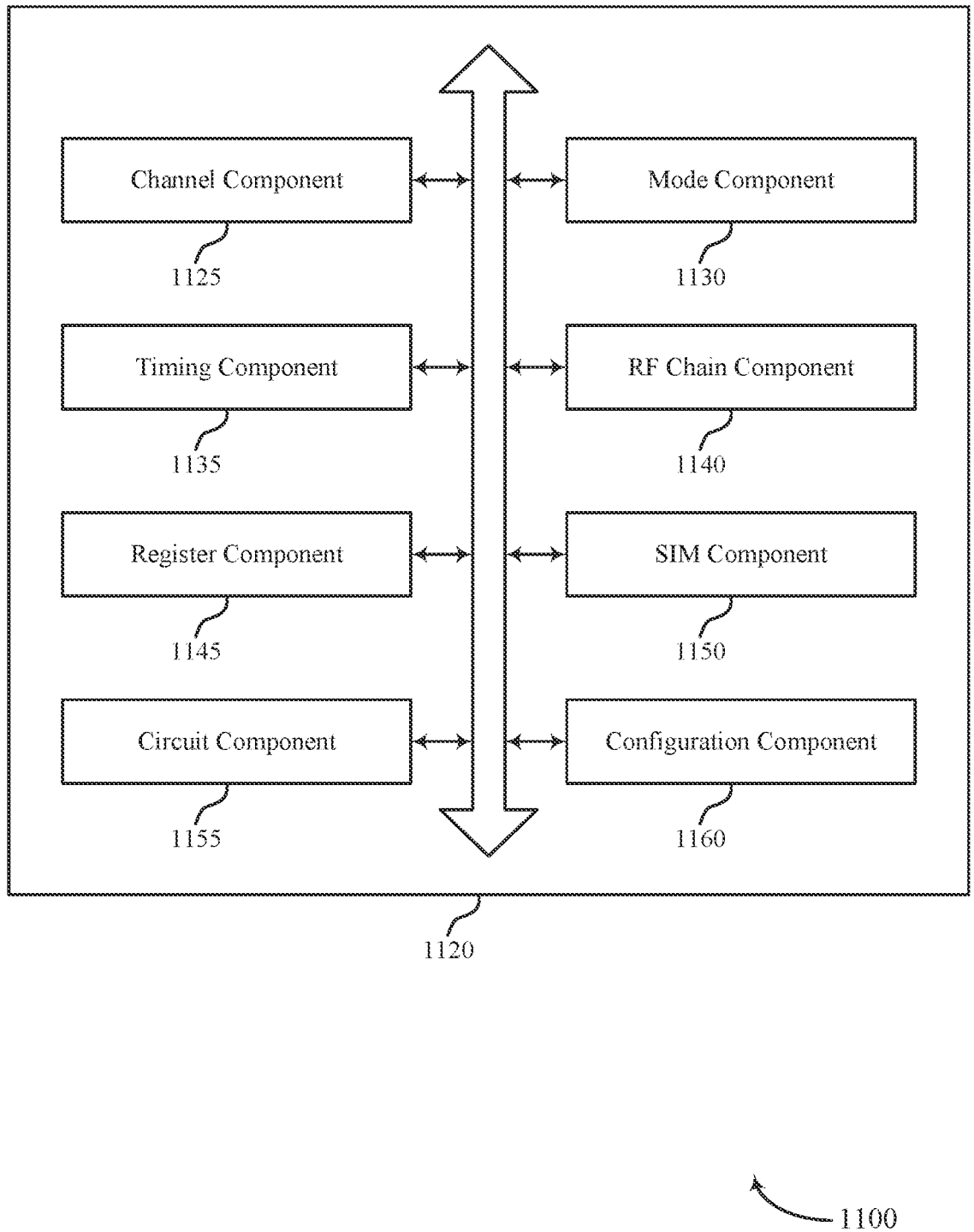
FIG. 11 shows a block diagram of a communications manager that supports techniques for managing a radio transceiver chain for multiple RATs in accordance with various aspects of the present disclosure.

FIG. 11 shows a block diagram 1100 of a communications manager 1120 that supports techniques for managing a radio transceiver chain for multiple RATs in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing a radio transceiver chain for multiple RATs as described herein. For example, the communications manager 1120 may include a channel component 1125, a mode component 1130, a timing component 1135, an RF chain component 1140, a register component 1145, a SIM component 1150, a circuit component 1155, a configuration component 1160, or any combination thereof. Each of these components may communicate, directly or indirectly, with one another (e.g., via one or more buses).

The communications manager 1120 may support wireless communication at a device in accordance with examples as disclosed herein. The channel component 1125 may be configured as or otherwise support a means for monitoring a channel for wireless communication associated with a first RAT during one or more of a first active duration or a first inactive duration, the device operating in a first power mode during the first inactive duration. In some examples, the channel component 1125 may be configured as or otherwise support a means for monitoring the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration. The mode component 1130 may be configured as or otherwise support a means for operating the device according to the first power mode or the second power mode based on the monitoring of the channel associated with the first RAT and the second RAT.

In some examples, the device includes a radio transceiver chain for one or more of receiving or transmitting the wireless communication associated with one or more of the first RAT or the second RAT. In some examples, the mode component 1130 may be configured as or otherwise support a means for operating the radio transceiver chain associated with the device in the first power mode during the first inactive duration based on the monitoring of the channel for the wireless communication associated with the first RAT during one or more of the first active duration or the first inactive duration. In some examples, to support monitoring the channel for the wireless communication associated with the first RAT, the RF chain component 1140 may be configured as or otherwise support a means for enabling the radio transceiver chain to monitor the channel for the wireless communication associated with the first RAT during the first active duration based on a timer. In some examples, to support monitoring the channel for the wireless communication associated with the first RAT, the timing component 1135 may be configured as or otherwise support a means for activating the timer based on the enabling of the radio transceiver chain to monitor the channel for the wireless communication associated with the first RAT during the first active duration.

In some examples, to support monitoring the channel for the wireless communication associated with the first RAT, the RF chain component 1140 may be configured as or otherwise support a means for disabling the radio transceiver chain from monitoring the channel for the wireless communication associated with the first RAT by switching the radio transceiver chain to operate in the first power mode during the first inactive duration based on the timer expiring. In some examples, the RF chain component 1140 may be configured as or otherwise support a means for operating the radio transceiver chain associated with the device in one or more of the first power mode or the second power mode during the second inactive duration based on the monitoring of the channel for the wireless communication associated with the second RAT during one or more of the second active duration or the second inactive duration.

In some examples, to support monitoring the channel for the wireless communication associated with the second RAT, the RF chain component 1140 may be configured as or otherwise support a means for enabling the radio transceiver chain to monitor the channel for the wireless communication associated with the second RAT during the second active duration based on a timer. In some examples, to support monitoring the channel for the wireless communication associated with the second RAT, the timing component 1135 may be configured as or otherwise support a means for activating the timer based on the enabling of the radio transceiver chain to monitor the channel for the wireless communication associated with the second RAT during the second active duration. In some examples, to support monitoring the channel for the wireless communication associated with the second RAT, the RF chain component 1140 may be configured as or otherwise support a means for disabling the radio transceiver chain from monitoring the channel for the wireless communication associated with the second RAT by switching the radio transceiver chain to operate in the first power mode or the second power mode during the second inactive duration based on the timer expiring.

In some examples, the RF chain component 1140 may be configured as or otherwise support a means for switching the radio transceiver chain to operate in the first power mode during the second inactive duration based on the first inactive duration nonoverlapping with one or more of an ending portion of the second active duration or a beginning portion of the third active duration following the second active duration. In some examples, the RF chain component 1140 may be configured as or otherwise support a means for switching the radio transceiver chain to operate in the second power mode during the second inactive duration based on the first inactive duration overlapping with one or more of an ending portion of the second active duration or a beginning portion of the third active duration following the second active duration.

In some examples, the configuration component 1160 may be configured as or otherwise support a means for receiving control signaling indicating a configuration for the device, the configuration indicating one or more of the first active duration, the first inactive duration, the second active duration, the second inactive duration, or the third active duration. In some examples, the mode component 1130 may be configured as or otherwise support a means for where operating the radio transceiver chain in one or more of the first power mode or the second power mode is based on the configuration. In some examples, the timing component 1135 may be configured as or otherwise support a means for adjusting the second active duration based on a portion of the first active duration overlapping with a portion of the second active duration.

In some examples, the timing component 1135 may be configured as or otherwise support a means for determining one or more of a beginning of the first active duration or a beginning of the second active duration based on scheduling information. In some examples, the timing component 1135 may be configured as or otherwise support a means for adjusting the beginning of the second active duration to occur before the beginning of the first active duration based on determining that the portion of the first active duration overlaps with the portion of the second active duration. In some examples, the timing component 1135 may be configured as or otherwise support a means for determining one or more of an ending of the first active duration or an ending of the second active duration based on scheduling information. In some examples, the timing component 1135 may be configured as or otherwise support a means for adjusting the ending of the second active duration to occur after the ending of the first active duration based on determining that the portion of the first active duration overlaps with the portion of the second active duration.

In some examples, the RF chain component 1140 may be configured as or otherwise support a means for allocating, based on a configuration, a first set of antennas associated with the device to monitor the channel for the wireless communication associated with the first RAT during one or more of the first active duration or the first inactive duration. In some examples, the RF chain component 1140 may be configured as or otherwise support a means for allocating, based on the configuration, a second set of antennas associated with the device to monitor the channel for the wireless communication associated with the second RAT during one or more of the second active duration or the second inactive duration. In some examples, the first set of antennas are nonoverlapping with the second set of antennas. In some examples, the RF chain component 1140 may be configured as or otherwise support a means for reallocating one or more of the first set of antennas or the second set of antennas based on one or more of the first active duration or the second active duration.

In some examples, the register component 1145 may be configured as or otherwise support a means for managing one or more memory registers associated with the device for one or more of the first RAT and the second RAT, the one or more memory registers corresponding to a radio transceiver chain associated with the device, the one or more memory registers are shared between the first RAT and the second RAT. In some examples, to support managing the one or more memory registers, the SIM component 1150 may be configured as or otherwise support a means for refraining a first SIM associated with the device and a second SIM associated with the device from jointly adjusting a state of the one or more memory registers, the first SIM corresponding to the first RAT and the second SIM corresponding to the second RAT.

In some examples, the SIM component 1150 may be configured as or otherwise support a means for refraining a first SIM associated with the device and a second SIM associated with the device from jointly adjusting an operating mode of a radio transceiver chain associated with the device. In some examples, the mode component 1130 may be configured as or otherwise support a means for adjusting an operating mode of a radio transceiver chain associated with the device based on an acknowledgement between a first SIM associated with the device and a second SIM associated with the device, the first SIM corresponding to the first RAT and the second SIM corresponding to the second RAT.

In some examples, the circuit component 1155 may be configured as or otherwise support a means for disabling a baseband circuit and an RF front-end circuit associated with the device while the device is operating in the first power mode. In some examples, the circuit component 1155 may be configured as or otherwise support a means for disabling a baseband circuit associated with the device based on the device operating in the second power mode. In some examples, the circuit component 1155 may be configured as or otherwise support a means for enabling an RF front-end circuit associated with the device based on the device operating in the second power mode. In some examples, the first active duration includes a 4G wakeup duration and the second active duration includes a 5G discontinuous reception duration. In some examples, the first RAT corresponds to a first SIM associated with the device and the second RAT corresponds to a second SIM associated with the device. In some examples, the device includes a MIMO radio transceiver chain enabled to perform spatial multiplexing. In some examples, one or more the first RAT or the second RAT includes a 4G RAT or a 5G RAT, or any other type of RAT.

Figure 12:
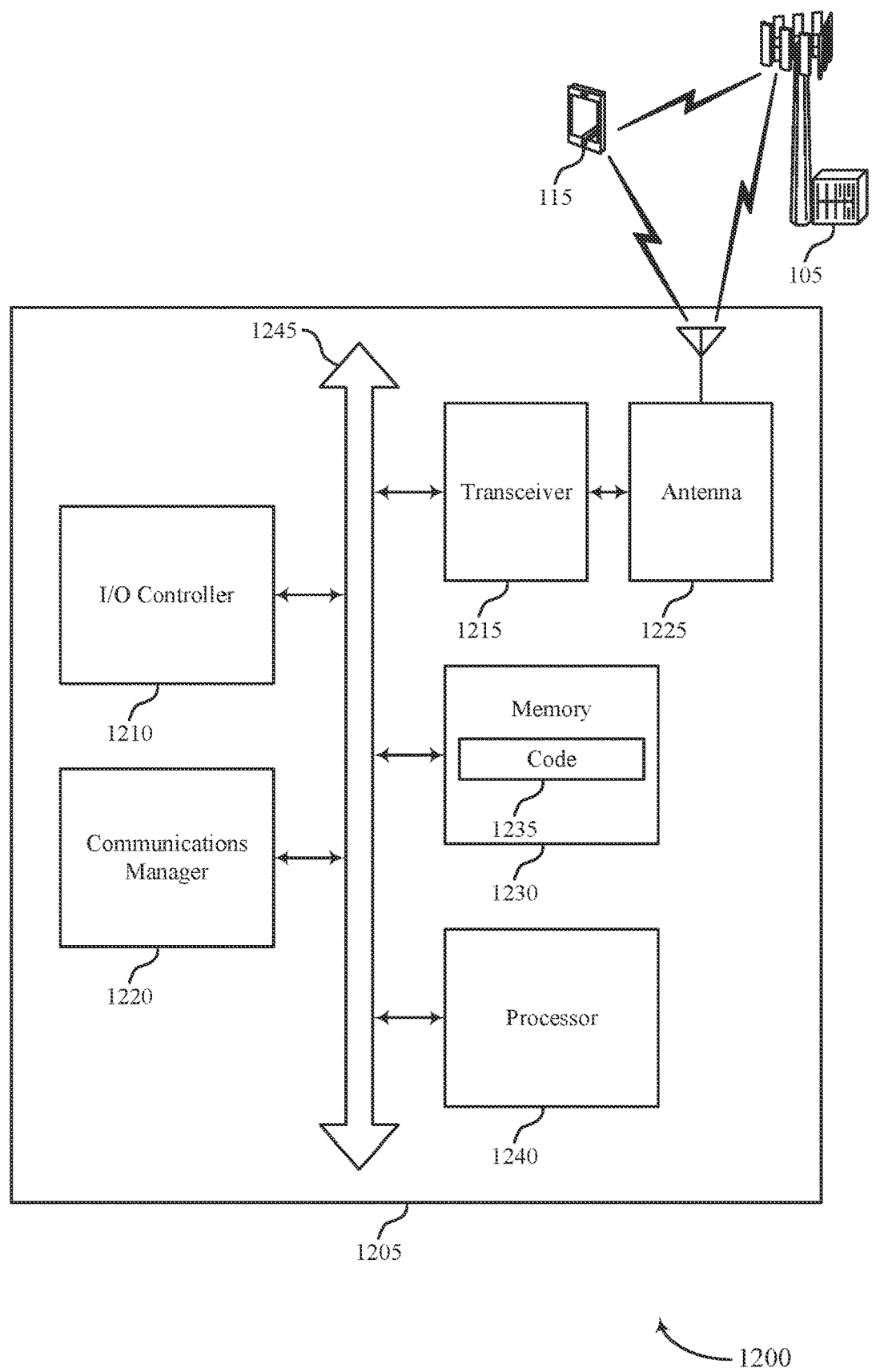
FIG. 12 shows a diagram of a system including a device that supports techniques for managing a radio transceiver chain for multiple RATs in accordance with various aspects of the present disclosure.

FIG. 12 shows a diagram of a system 1200 including a device 1205 that supports techniques for managing a radio transceiver chain for multiple RATs in accordance with various aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing a radio transceiver chain for multiple RATs). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at the device 1205 in accordance with examples as disclosed herein. For example, the communications manager 1220 may be configured as or otherwise support a means for monitoring a channel for wireless communication associated with a first RAT during one or more of a first active duration or a first inactive duration, the device 1205 operating in a first power mode during the first inactive duration. The communications manager 1220 may be configured as or otherwise support a means for monitoring the channel for wireless communication associated with a second RAT during one or more of a second active duration or a second inactive duration, the device 1205 operating during the second inactive duration in one or more of the first power mode based on an absence of an overlap between the first active duration and one or more of the second active duration or a third active duration, or a second power mode based on the overlap between the first active duration and one or more of the second active duration or the third active duration. The communications manager 1220 may be configured as or otherwise support a means for operating the device 1205 according to the first power mode or the second power mode based on the monitoring of the channel associated with the first RAT and the second RAT. By including or configuring the communications manager 1220 in accordance with examples as described herein, the device 1205 may support techniques for more efficient utilization of communication resources and longer battery life.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing a radio transceiver chain for multiple RATs as described herein, or the processor 1240 and the memory 1230 may be otherwise configured to perform or support such operations.

Figure 13:
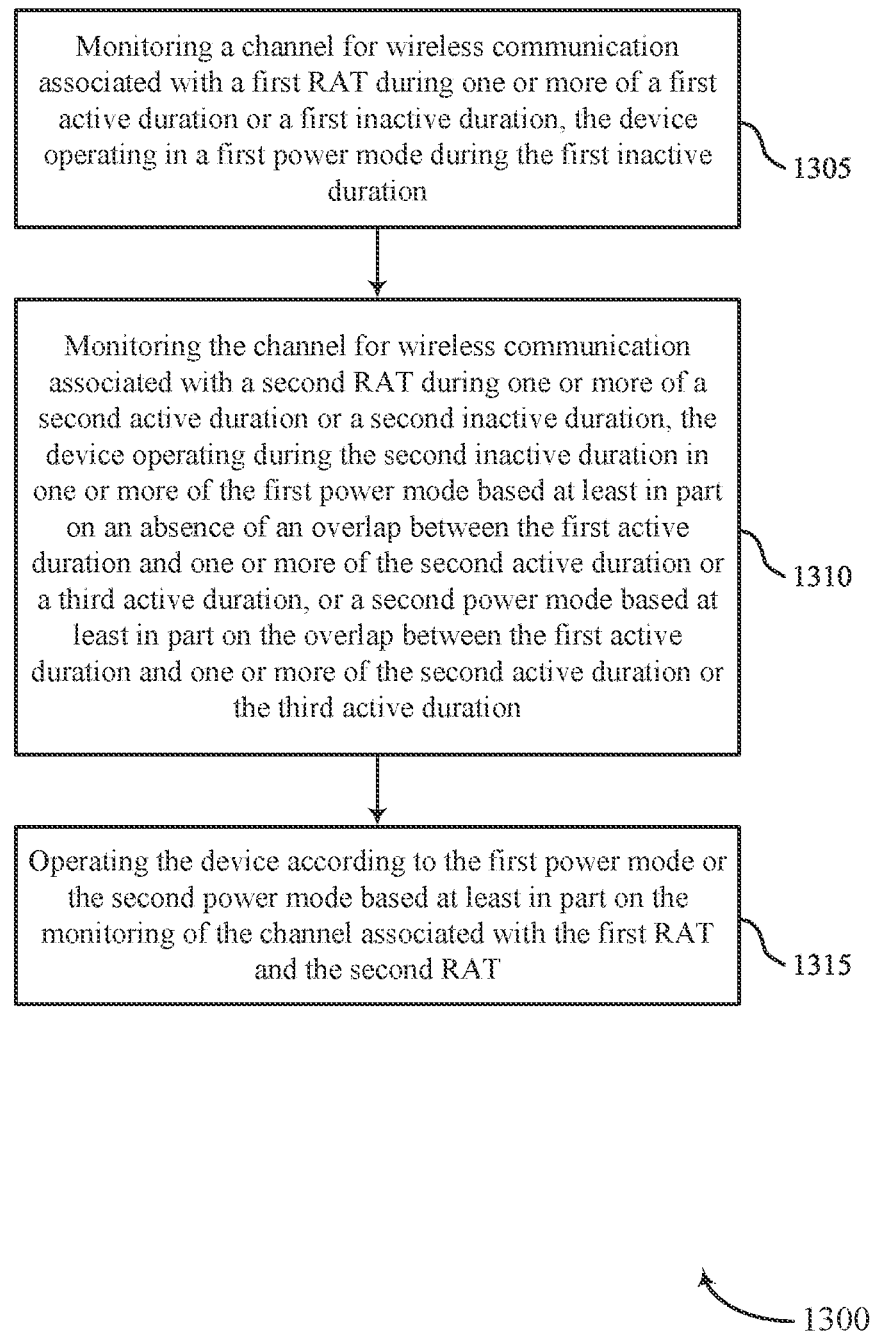
FIGS. 13 through 16 show flowcharts illustrating methods that support techniques for managing a radio transceiver chain for multiple RATs in accordance with various aspects of the present disclosure.

FIG. 13 shows a flowchart illustrating a method 1300 that supports techniques for managing a radio transceiver chain for multiple RATs in accordance with various aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include monitoring a channel for wireless communication associated with a first RAT during one or more of a first active duration or a first inactive duration, the device operating in a first power mode during the first inactive duration. The operations of 1305 may be performed in accordance with examples as disclosed herein. In some examples, aspects of the operations of 1305 may be performed by a channel component 1125 as described with reference to FIG. 11.

At 1310, the method may include monitoring the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration. The operations of 1310 may be performed in accordance with examples as disclosed herein. In some examples, aspects of the operations of 1310 may be performed by a channel component 1125 as described with reference to FIG. 11.

At 1315, the method may include operating the device according to the first power mode or the second power mode based on the monitoring of the channel associated with the first RAT and the second RAT. The operations of 1315 may be performed in accordance with examples as disclosed herein. In some examples, aspects of the operations of 1315 may be performed by a mode component 1130 as described with reference to FIG. 11.

Figure 14:
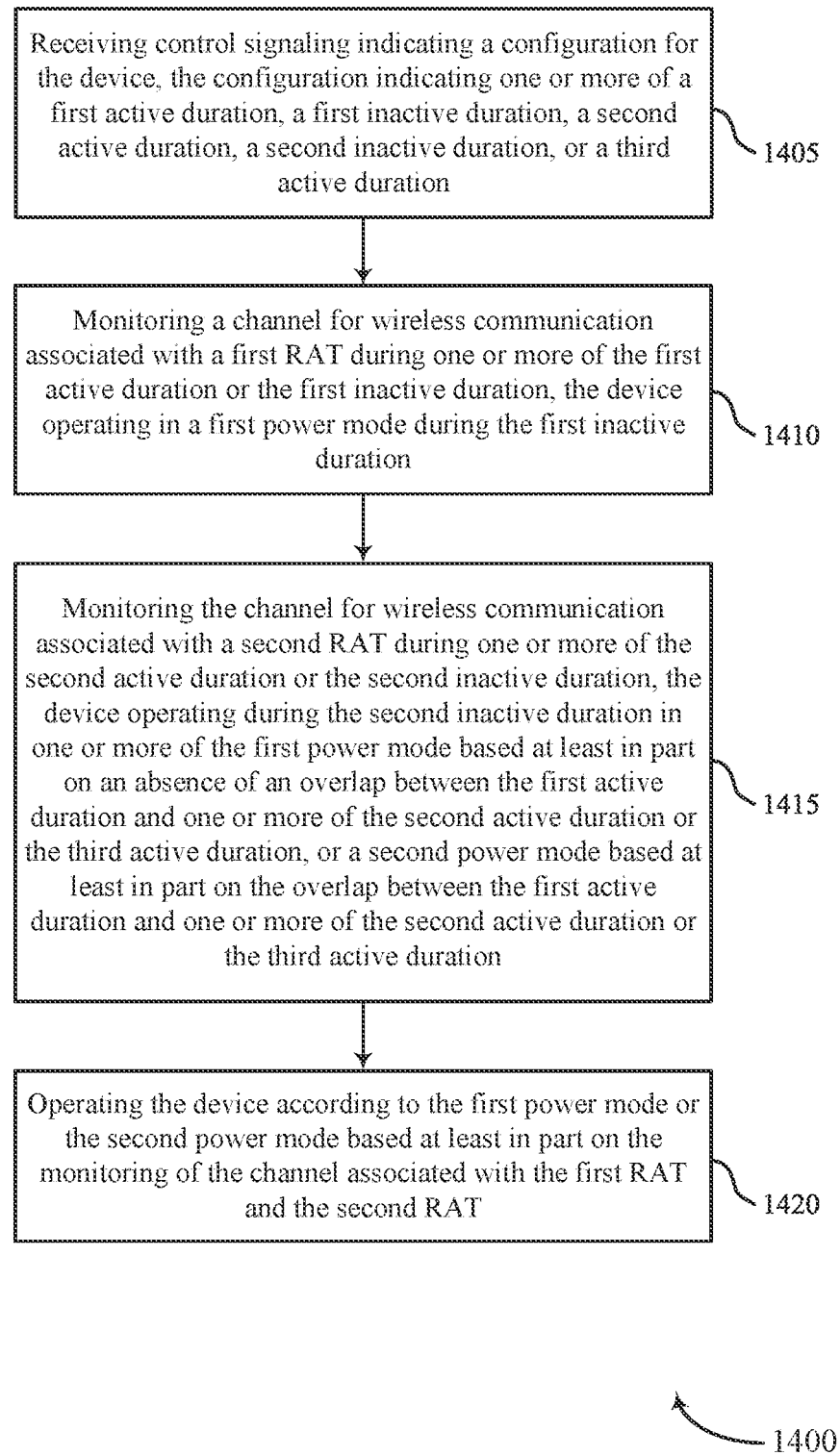

FIG. 14 shows a flowchart illustrating a method 1400 that supports techniques for managing a radio transceiver chain for multiple RATs in accordance with various aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a configuration for the device, the configuration indicating one or more of a first active duration, a first inactive duration, a second active duration, a second inactive duration, or a third active duration. The operations of 1405 may be performed in accordance with examples as disclosed herein. In some examples, aspects of the operations of 1405 may be performed by a configuration component 1160 as described with reference to FIG. 11.

At 1410, the method may include monitoring a channel for wireless communication associated with a first RAT during one or more of the first active duration or the first inactive duration, the device operating in a first power mode during the first inactive duration. The operations of 1410 may be performed in accordance with examples as disclosed herein. In some examples, aspects of the operations of 1410 may be performed by a channel component 1125 as described with reference to FIG. 11.

At 1415, the method may include monitoring the channel for wireless communication associated with a second RAT during one or more of the second active duration or the second inactive duration, the device operating during the second inactive duration in one or more of the first power mode based on an absence of an overlap between the first active duration and one or more of the second active duration or the third active duration, or a second power mode based on the overlap between the first active duration and one or more of the second active duration or the third active duration. The operations of 1415 may be performed in accordance with examples as disclosed herein. In some examples, aspects of the operations of 1415 may be performed by a channel component 1125 as described with reference to FIG. 11.

At 1420, the method may include operating the device according to the first power mode or the second power mode based on the monitoring of the channel associated with the first RAT and the second RAT. The operations of 1420 may be performed in accordance with examples as disclosed herein. In some examples, aspects of the operations of 1420 may be performed by a mode component 1130 as described with reference to FIG. 11.

Figure 15:
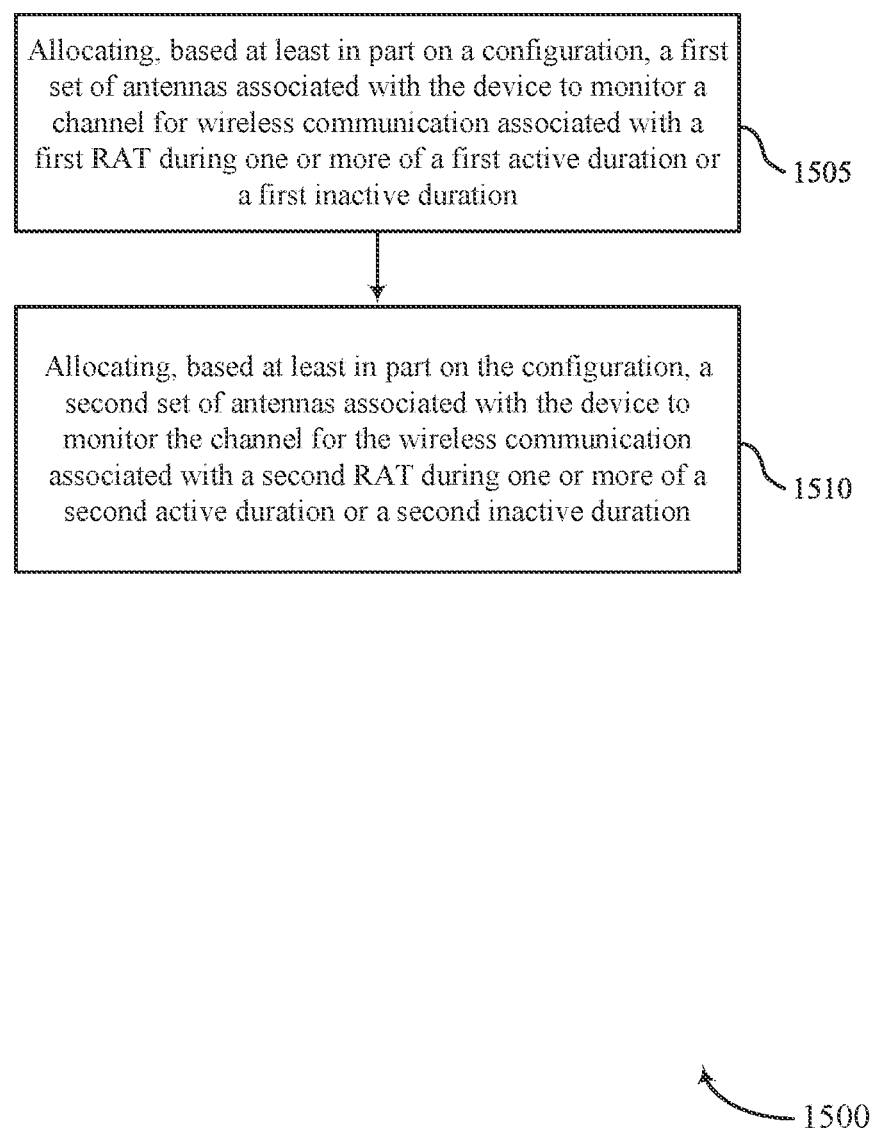

FIG. 15 shows a flowchart illustrating a method 1500 that supports techniques for managing a radio transceiver chain for multiple RATs in accordance with various aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include allocating, based on a configuration, a first set of antennas associated with the device to monitor a channel for wireless communication associated with a first RAT during one or more of a first active duration or a first inactive duration. The operations of 1505 may be performed in accordance with examples as disclosed herein. In some examples, aspects of the operations of 1550 may be performed by an RF chain component 1140 as described with reference to FIG. 11.

At 1510, the method may include allocating, based on the configuration, a second set of antennas associated with the device to monitor the channel for the wireless communication associated with a second RAT during one or more of a second active duration or a second inactive duration. The operations of 1510 may be performed in accordance with examples as disclosed herein. In some examples, aspects of the operations of 1510 may be performed by an RF chain component 1140 as described with reference to FIG. 11.

Figure 16:
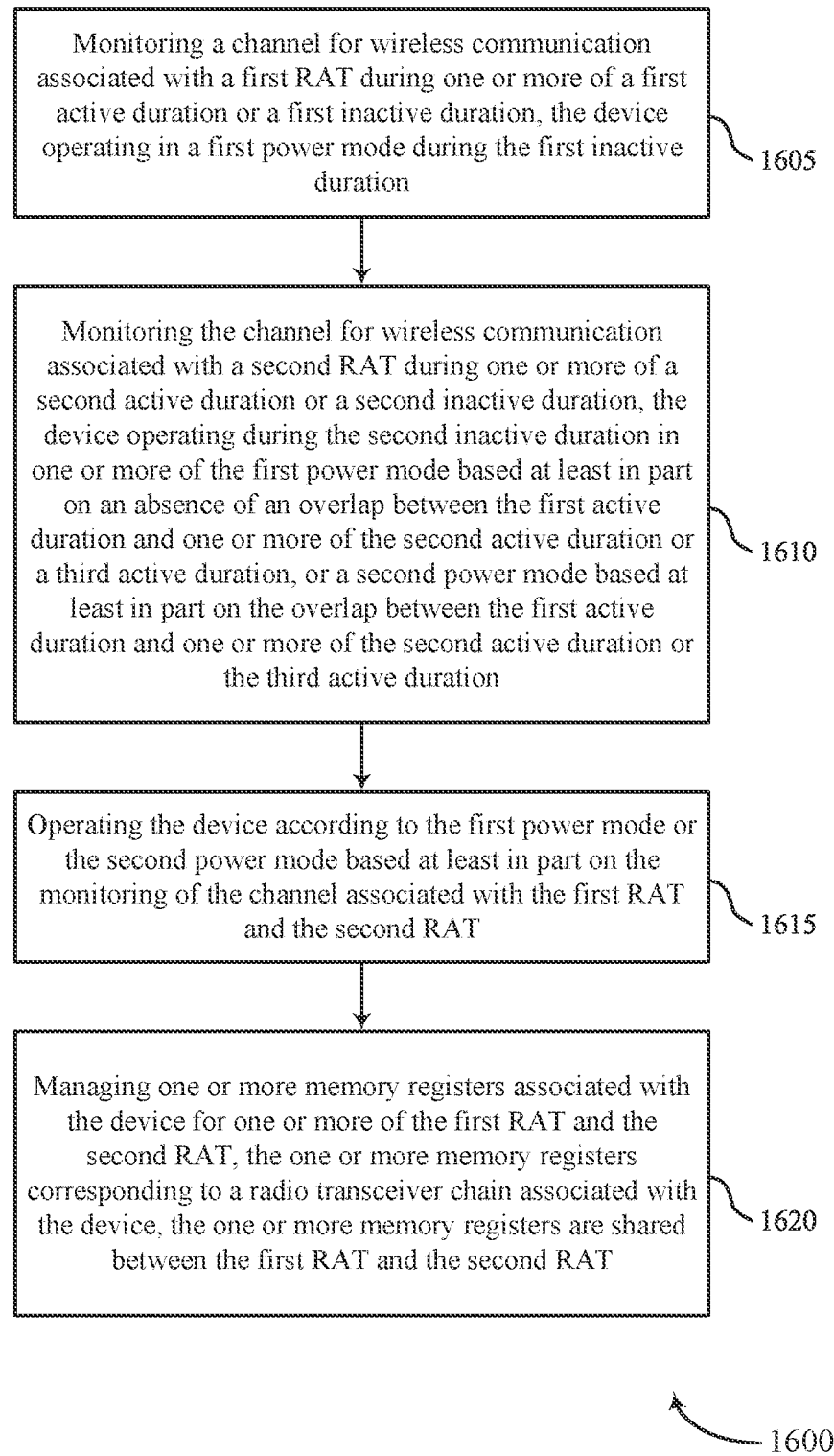

FIG. 16 shows a flowchart illustrating a method 1600 that supports techniques for managing a radio transceiver chain for multiple RATs in accordance with various aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include monitoring a channel for wireless communication associated with a first RAT during one or more of a first active duration or a first inactive duration, the device operating in a first power mode during the first inactive duration. The operations of 1605 may be performed in accordance with examples as disclosed herein. In some examples, aspects of the operations of 1605 may be performed by a channel component 1125 as described with reference to FIG. 11.

At 1610, the method may include monitoring the channel for wireless communication associated with a second RAT during one or more of a second active duration or a second inactive duration, the device operating during the second inactive duration in one or more of the first power mode based on an absence of an overlap between the first active duration and one or more of the second active duration or a third active duration, or a second power mode based on the overlap between the first active duration and one or more of the second active duration or the third active duration. The operations of 1610 may be performed in accordance with examples as disclosed herein. In some examples, aspects of the operations of 1610 may be performed by a channel component 1125 as described with reference to FIG. 11.

At 1615, the method may include operating the device according to the first power mode or the second power mode based on the monitoring of the channel associated with the first RAT and the second RAT. The operations of 1615 may be performed in accordance with examples as disclosed herein. In some examples, aspects of the operations of 1615 may be performed by a mode component 1130 as described with reference to FIG. 11.

At 1620, the method may include managing one or more memory registers associated with the device for one or more of the first RAT and the second RAT, the one or more memory registers corresponding to a radio transceiver chain associated with the device, the one or more memory registers are shared between the first RAT and the second RAT. The operations of 1620 may be performed in accordance with examples as disclosed herein. In some examples, aspects of the operations of 1620 may be performed by a register component 1145 as described with reference to FIG. 11.

The following provides an overview of aspects of the present disclosure:

Aspect 1: A method for wireless communication at a device, comprising: monitoring a channel for wireless communication associated with a first RAT during one or more of a first active duration or a first inactive duration, the device operating in a first power mode during the first inactive duration; monitoring the channel for wireless communication associated with a second RAT during one or more of a second active duration or a second inactive duration, the device operating during the second inactive duration in one or more of the first power mode based at least in part on an absence of an overlap between the first active duration and one or more of the second active duration or a third active duration, or a second power mode based at least in part on the overlap between the first active duration and one or more of the second active duration or the third active duration; and operating the device according to the first power mode or the second power mode based at least in part on the monitoring of the channel associated with the first RAT and the second RAT.

Aspect 2: The method of aspect 1, wherein the device includes a radio transceiver chain for one or more of receiving or transmitting the wireless communication associated with one or more of the first RAT or the second RAT.

Aspect 3: The method of aspect 2, further comprising: operating the radio transceiver chain associated with the device in the first power mode during the first inactive duration based at least in part on the monitoring of the channel for the wireless communication associated with the first RAT during one or more of the first active duration or the first inactive duration.

Aspect 4: The method of aspect 3, wherein monitoring the channel for the wireless communication associated with the first RAT comprises: enabling the radio transceiver chain to monitor the channel for the wireless communication associated with the first RAT during the first active duration based at least in part on a timer; activating the timer based at least in part on the enabling of the radio transceiver chain to monitor the channel for the wireless communication associated with the first RAT during the first active duration; and disabling the radio transceiver chain from monitoring the channel for the wireless communication associated with the first RAT by switching the radio transceiver chain to operate in the first power mode during the first inactive duration based at least in part on the timer expiring.

Aspect 5: The method of any of aspects 3 through 4, further comprising: operating the radio transceiver chain associated with the device in one or more of the first power mode or the second power mode during the second inactive duration based at least in part on the monitoring of the channel for the wireless communication associated with the second RAT during one or more of the second active duration or the second inactive duration.

Aspect 6: The method of aspect 5, wherein monitoring the channel for the wireless communication associated with the second RAT comprises: enabling the radio transceiver chain to monitor the channel for the wireless communication associated with the second RAT during the second active duration based at least in part on a timer; activating the timer based at least in part on the enabling of the radio transceiver chain to monitor the channel for the wireless communication associated with the second RAT during the second active duration; and disabling the radio transceiver chain from monitoring the channel for the wireless communication associated with the second RAT by switching the radio transceiver chain to operate in the first power mode or the second power mode during the second inactive duration based at least in part on the timer expiring.

Aspect 7: The method of aspect 6, further comprising: switching the radio transceiver chain to operate in the first power mode during the second inactive duration based at least in part on the first inactive duration nonoverlapping with one or more of an ending portion of the second active duration or a beginning portion of the third active duration following the second active duration.

Aspect 8: The method of any of aspects 6 through 7, further comprising: switching the radio transceiver chain to operate in the second power mode during the second inactive duration based at least in part on the first inactive duration overlapping with one or more of an ending portion of the second active duration or a beginning portion of the third active duration following the second active duration.

Aspect 9: The method of any of aspects 2 through 8, further comprising: receiving control signaling indicating a configuration for the device, the configuration indicating one or more of the first active duration, the first inactive duration, the second active duration, the second inactive duration, or the third active duration, wherein operating the radio transceiver chain in one or more of the first power mode or the second power mode is based at least in part on the configuration.

Aspect 10: The method of any of aspects 1 through 9, further comprising: adjusting the second active duration based at least in part on a portion of the first active duration overlapping with a portion of the second active duration.

Aspect 11: The method of aspect 10, further comprising: determining one or more of a beginning of the first active duration or a beginning of the second active duration based at least in part on scheduling information; and adjusting the beginning of the second active duration to occur before the beginning of the first active duration based at least in part on determining that the portion of the first active duration overlaps with the portion of the second active duration.

Aspect 12: The method of any of aspects 10 through 11, further comprising: determining one or more of an ending of the first active duration or an ending of the second active duration based at least in part on scheduling information; and adjusting the ending of the second active duration to occur after the ending of the first active duration based at least in part on determining that the portion of the first active duration overlaps with the portion of the second active duration.

Aspect 13: The method of any of aspects 1 through 12, further comprising: allocating, based at least in part on a configuration, a first set of antennas associated with the device to monitor the channel for the wireless communication associated with the first RAT during one or more of the first active duration or the first inactive duration; and allocating, based at least in part on the configuration, a second set of antennas associated with the device to monitor the channel for the wireless communication associated with the second RAT during one or more of the second active duration or the second inactive duration.

Aspect 14: The method of aspect 13, wherein the first set of antennas are nonoverlapping with the second set of antennas.

Aspect 15: The method of any of aspects 13 through 14, further comprising: reallocating one or more of the first set of antennas or the second set of antennas based at least in part on one or more of the first active duration or the second active duration.

Aspect 16: The method of any of aspects 1 through 15, further comprising: managing one or more memory registers associated with the device for one or more of the first RAT and the second RAT, the one or more memory registers corresponding to a radio transceiver chain associated with the device, the one or more memory registers are shared between the first RAT and the second RAT.

Aspect 17: The method of aspect 16, wherein managing the one or more memory registers comprises: refraining a first SIM associated with the device and a second SIM associated with the device from jointly adjusting a state of the one or more memory registers, the first SIM corresponding to the first RAT and the second SIM corresponding to the second RAT.

Aspect 18: The method of any of aspects 1 through 17, further comprising: refraining a first SIM associated with the device and a second SIM associated with the device from jointly adjusting an operating mode of a radio transceiver chain associated with the device.

Aspect 19: The method of any of aspects 1 through 18, further comprising: adjusting an operating mode of a radio transceiver chain associated with the device based at least in part on an acknowledgement between a first SIM associated with the device and a second SIM associated with the device, the first SIM corresponding to the first RAT and the second SIM corresponding to the second RAT.

Aspect 20: The method of any of aspects 1 through 19, further comprising: disabling a baseband circuit and an RF front-end circuit associated with the device while the device is operating in the first power mode.

Aspect 21: The method of any of aspects 1 through 20, further comprising: disabling a baseband circuit associated with the device based at least in part on the device operating in the second power mode; and enabling an RF front-end circuit associated with the device based at least in part on the device operating in the second power mode.

Aspect 22: The method of any of aspects 1 through 21, wherein the first active duration includes a 4G wakeup duration and the second active duration includes a 5G discontinuous reception duration.

Aspect 23: The method of any of aspects 1 through 22, wherein the first RAT corresponds to a first SIM associated with the device and the second RAT corresponds to a second SIM associated with the device.

Aspect 24: The method of any of aspects 1 through 23, wherein the device includes a multiple-input multiple-output radio transceiver chain enabled to perform spatial multiplexing.

Aspect 25: The method of any of aspects 1 through 24, wherein one or more the first RAT or the second RAT includes a 4G RAT or a 5G RAT.

Aspect 26: An apparatus for wireless communication at a device, comprising: a processor; memory coupled with the processor; and instructions stored in the memory and executable by the processor to cause the apparatus to perform a method of any of aspects 1 through 25.

Aspect 27: An apparatus for wireless communication at a device, comprising at least one means for performing a method of any of aspects 1 through 25.

Aspect 28: A non-transitory computer-readable medium storing code for wireless communication at a device, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
    receiving first wireless communications associated with a first radio access technology during one or more of a first active duration associated with a first power mode or a first inactive duration associated with a second power mode that consumes less power than the first power mode; and
    receiving second wireless communications associated with a second radio access technology during one or more of a second active duration associated with the first power mode or a second inactive duration associated with the second power mode, the device operating in a third power mode different from the second power mode during at least a portion of the second inactive duration when the first active duration associated with the first radio access technology overlaps with the second active duration associated with the second radio access technology, wherein the device switches from the first power mode to the third power mode without reconfiguring one or more radio frequency front-end switches shared between the first radio access technology and the second radio access technology.

2. The method of claim 1, wherein the device includes a radio transceiver chain for one or more of receiving or transmitting wireless communications associated with one or more of the first radio access technology or the second radio access technology.

3. The method of claim 2, further comprising:
    operating the radio transceiver chain associated with the device in the first power mode during the first inactive duration based at least in part on monitoring for the first wireless communications associated with the first radio access technology during one or more of the first active duration or the first inactive duration.

4. The method of claim 3, wherein receiving the first wireless communications associated with the first radio access technology comprises:
    enabling the radio transceiver chain to monitor for the first wireless communications associated with the first radio access technology during the first active duration based at least in part on a timer;
    activating the timer based at least in part on enabling the radio transceiver chain to monitor for the second wireless communications associated with the first radio access technology during the first active duration; and
    disabling the radio transceiver chain from monitoring for the first wireless communications associated with the first radio access technology by switching the radio transceiver chain to operate in the first power mode during the first inactive duration based at least in part on the timer expiring.

5. The method of claim 3, further comprising:
operating the radio transceiver chain associated with the device in one or more of the first power mode or the second power mode during the second inactive duration based at least in part on monitoring of for the second wireless communications associated with the second radio access technology during one or more of the second active duration or the second inactive duration.

6. The method of claim 5, wherein receiving the second wireless communications associated with the second radio access technology comprises:
enabling the radio transceiver chain to monitor for the second wireless communications associated with the second radio access technology during the second active duration based at least in part on a timer;
activating the timer based at least in part on enabling the radio transceiver chain to monitor for the second wireless communications associated with the second radio access technology during the second active duration; and
disabling the radio transceiver chain from monitoring for the second wireless communications associated with the second radio access technology by switching the radio transceiver chain to operate in the first power mode or the second power mode during the second inactive duration based at least in part on the timer expiring.

7. The method of claim 6, further comprising:
switching the radio transceiver chain to operate in the first power mode during the second inactive duration based at least in part on an absence of an overlap between the first inactive duration and one or more of an ending portion of the second active duration or a beginning portion of a third active duration following the second active duration.

8. The method of claim 6, further comprising:
switching the radio transceiver chain to operate in the second power mode during the second inactive duration based at least in part on the first inactive duration overlapping with one or more of an ending portion of the second active duration or a beginning portion of a third active duration following the second active duration.

9. The method of claim 2, further comprising:
receiving control signaling indicating a configuration for the device, the configuration indicating one or more of the first active duration, the first inactive duration, the second active duration, the second inactive duration, or a third active duration following the second active duration,
wherein operating the radio transceiver chain in one or more of the first power mode or the second power mode is based at least in part on the configuration.

10. The method of claim 1, further comprising:
adjusting the second active duration based at least in part on a portion of the first active duration overlapping with a portion of the second active duration.

11. The method of claim 10, further comprising:
determining one or more of a beginning of the first active duration or a beginning of the second active duration based at least in part on scheduling information; and
adjusting the beginning of the second active duration to occur before the beginning of the first active duration based at least in part on determining that the portion of the first active duration overlaps with the portion of the second active duration.

12. The method of claim 10, further comprising:
determining one or more of an ending of the first active duration or an ending of the second active duration based at least in part on scheduling information; and
adjusting the ending of the second active duration to occur after the ending of the first active duration based at least in part on determining that the portion of the first active duration overlaps with the portion of the second active duration.

13. The method of claim 1, further comprising:
allocating, based at least in part on a configuration, a first set of antennas associated with the device to monitor for the first wireless communications associated with the first radio access technology during one or more of the first active duration or the first inactive duration; and
allocating, based at least in part on the configuration, a second set of antennas associated with the device to monitor for the second wireless communications associated with the second radio access technology during one or more of the second active duration or the second inactive duration.

14. The method of claim 13, wherein the first set of antennas are nonoverlapping with the second set of antennas.

15. The method of claim 13, further comprising:
reallocating one or more of the first set of antennas or the second set of antennas based at least in part on one or more of the first active duration or the second active duration.

16. The method of claim 1, further comprising:
managing one or more memory registers associated with the device for one or more of the first radio access technology and the second radio access technology, the one or more memory registers corresponding to a radio transceiver chain associated with the device, the one or more memory registers are shared between the first radio access technology and the second radio access technology.

17. The method of claim 16, wherein managing the one or more memory registers comprises:
refraining a first subscriber identity module associated with the device and a second subscriber identity module associated with the device from jointly adjusting a configuration of the one or more memory registers, the first subscriber identity module corresponding to the first radio access technology and the second subscriber identity module corresponding to the second radio access technology.

18. The method of claim 1, further comprising:
refraining a first subscriber identity module associated with the device and a second subscriber identity module associated with the device from jointly adjusting an operating mode of a radio transceiver chain associated with the device.

19. The method of claim 1, further comprising:
adjusting an operating mode of a radio transceiver chain associated with the device based at least in part on an acknowledgement between a first subscriber identity module associated with the device and a second subscriber identity module associated with the device, the first subscriber identity module corresponding to the first radio access technology and the second subscriber identity module corresponding to the second radio access technology.

20. The method of claim 1, further comprising:
disabling a baseband circuit and a radio frequency front-end circuit associated with the device while the device is operating in the first power mode.

21. The method of claim 1, further comprising:
disabling a baseband circuit associated with the device based at least in part on the device operating in the second power mode; and
enabling a radio frequency front-end circuit associated with the device based at least in part on the device operating in the second power mode.

22. The method of claim 1, wherein the first active duration includes a fourth generation wakeup duration and the second active duration includes a fifth generation discontinuous reception duration.

23. The method of claim 1, wherein the first radio access technology corresponds to a first subscriber identity module associated with the device and the second radio access technology corresponds to a second subscriber identity module associated with the device.

24. The method of claim 1, wherein the device includes a multiple-input multiple-output radio transceiver chain enabled to perform spatial multiplexing.

25. The method of claim 1, wherein one or more the first radio access technology or the second radio access technology includes a fourth generation radio access technology or a fifth generation radio access technology.

26. An apparatus for wireless communication at a device, comprising:
a processor;
memory coupled with the processor; and
instructions stored in the memory and executable by the processor to cause the apparatus to:
receive first wireless communications associated with a first radio access technology during one or more of a first active duration associated with a first power mode or a first inactive duration associated with a second power mode that consumes less power than the first power mode; and
receive second wireless communications associated with a second radio access technology during one or more of a second active duration associated with the first power mode or a second inactive duration associated with the second power mode, the device operating in a third power mode different from the second power mode during at least a portion of the second inactive duration when the first active duration associated with the first radio access technology overlaps with the second active duration associated with the second radio access technology, wherein the device switches from the first power mode to the third power mode without reconfiguring one or more radio frequency front-end switches shared between the first radio access technology and the second radio access technology.

27. The apparatus of claim 26, wherein the device includes a radio transceiver chain for one or more of receiving or transmitting wireless communications associated with one or more of the first radio access technology or the second radio access technology.

28. The apparatus of claim 27, wherein the instructions are further executable by the processor to cause the apparatus to:
operate the radio transceiver chain associated with the device in the first power mode during the first inactive duration based at least in part on monitoring for the first wireless communications associated with the first radio access technology during one or more of the first active duration or the first inactive duration.

29. An apparatus for wireless communication at a device, comprising:
means for receiving first wireless communications associated with a first radio access technology during one or more of a first active duration associated with a first power mode or a first inactive duration associated with a second power mode that consumes less power than the first power mode; and
means for receiving second wireless communications associated with a second radio access technology during one or more of a second active duration associated with the first power mode or a second inactive duration associated with the second power mode, the device operating in a third power mode different from the second power mode during at least a portion of the second inactive duration when the first active duration associated with the first radio access technology overlaps with the second active duration associated with the second radio access technology, wherein the device switches from the first power mode to the third power mode without reconfiguring one or more radio frequency front-end switches shared between the first radio access technology and the second radio access technology.

30. A non-transitory computer-readable medium storing code for wireless communication at a device, the code comprising instructions executable by a processor to:
receive first wireless communications associated with a first radio access technology during one or more of a first active duration associated with a first power mode or a first inactive duration associated with a second power mode that consumes less power than the first power mode; and
receive second wireless communications associated with a second radio access technology during one or more of a second active duration associated with the first power mode or a second inactive duration associated with the second power mode, the device operating in a third power mode different from the second power mode during at least a portion of the second inactive duration when the first active duration associated with the first radio access technology overlaps with the second active duration associated with the second radio access technology, wherein the device switches from the first power mode to the third power mode without reconfiguring one or more radio frequency front-end switches shared between the first radio access technology and the second radio access technology.

* * * * *